United States Patent [19]

Otagawa et al.

[11] Patent Number: 5,294,504
[45] Date of Patent: Mar. 15, 1994

[54] THREE-DIMENSIONAL MICROSTRUCTURE AS A SUBSTRATE FOR A BATTERY ELECTRODE

[75] Inventors: Takaaki Otagawa, Fremont; Arvind N. Jina, Redwood City; Marc J. Madou, Palo Alto, all of Calif.

[73] Assignee: Osaka Gas Company, Ltd., Osaka, Japan

[21] Appl. No.: 861,368

[22] Filed: Mar. 31, 1992

Related U.S. Application Data

[63] Continuation-in-part of Ser. No. 334,680, Apr. 6, 1989, Pat. No. 5,002,700, and a continuation-in-part of Ser. No. 599,002, Oct. 17, 1990, abandoned, and a continuation-in-part of Ser. No. 675,091, Mar. 25, 1991, Pat. No. 5,187,034, and a continuation-in-part of Ser. No. 828,414, Jan. 31, 1992.

[51] Int. Cl.$^5$ .............................................. H01M 4/60
[52] U.S. Cl. .................................... 429/213; 429/237; 428/411.1
[58] Field of Search ................ 204/290 R; 429/213, 429/42, 237; 252/500; 428/411.1

[56] References Cited

U.S. PATENT DOCUMENTS

| | | | |
|---|---|---|---|
| 4,851,487 | 4/1989 | Yaniger et al. | 252/500 |
| 4,869,949 | 9/1989 | Muenstedt | 204/290 R |
| 4,973,391 | 11/1990 | Madou et al. | 204/78 |
| 5,108,573 | 4/1992 | Rubinstein et al. | 204/290 R |
| 5,133,841 | 7/1992 | Higo et al. | 204/59 R |

OTHER PUBLICATIONS

Ivor Brodie et al., "The Physics of Microfabrication", *SRI International*, May 1992, pp. 1-78.
Reginald M. Penner et al., "Controlling the Morphology of Electronically Conductive Polymers", *Journal of the Electrochemical Society*, Oct. 1986, pp. 2206.
Xiantong Bi et al., "An Electrically-Conductive Composite Prepared by Electrochemical Polymerization of Pyrrole into Polyurethane", *Synthetic Metals*, vol. 22, 1987, pp. 145-156.
Masayoshi Watanabe et al., "Polypyrrole/Polymer Electrolyte Bilayer Composites Prepared by Electrochemical Polymerization of Pyrrole Using Ion-Conducting Polymers as a Solid Electrolyte", *Chemistry Letters*, 1987, pp. 1239-1242.
Niwa, O. et al., Kobunshi Ronbunshu, vol. 44, #4, 1987, pp. 225-233.

*Primary Examiner*—Kathryn Gorgos
*Attorney, Agent, or Firm*—Phillips, Moore, Lempio & Finley

[57] ABSTRACT

The present invention concerns a three dimensional conductive organic polymer covered micro structure having improved current carrying capacity as compared to a substantially smooth surface. More specifically, it relates to a three-dimensional poly(aniline) or poly(pyrrole)-substrate micro structure for use as a battery electrode, having improved properties as compared to a substantially smooth surface, which structure comprises: a thin surface layer of poly(aniline) or poly(pyrrole) film on a substrate surface, wherein the polyaniline or poly(pyrrole) film has a thickness of between about 0.1 and 10 microns and the substrate surface is irregular or patterned having a protruding surface, wherein representative protrusions amount to between about 40 to 90 percent of the surface of the electrode. The processes to produce the three-dimensional microstructure are also disclosed.

12 Claims, 36 Drawing Sheets

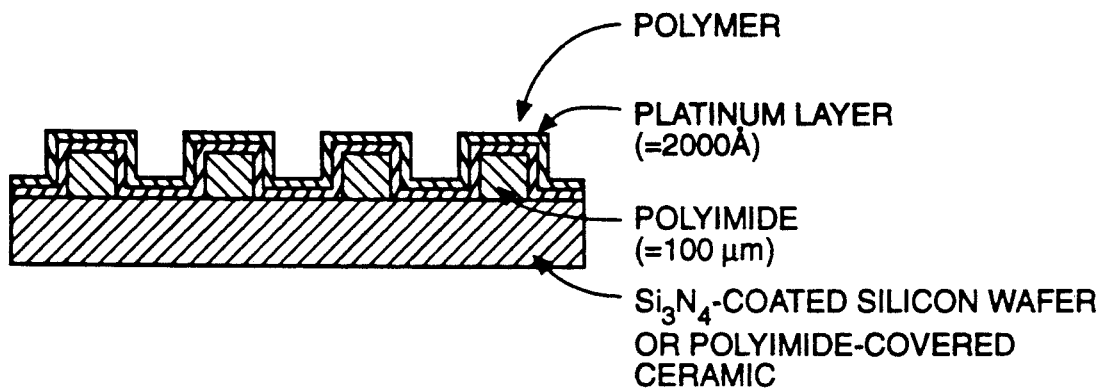
FIG._1
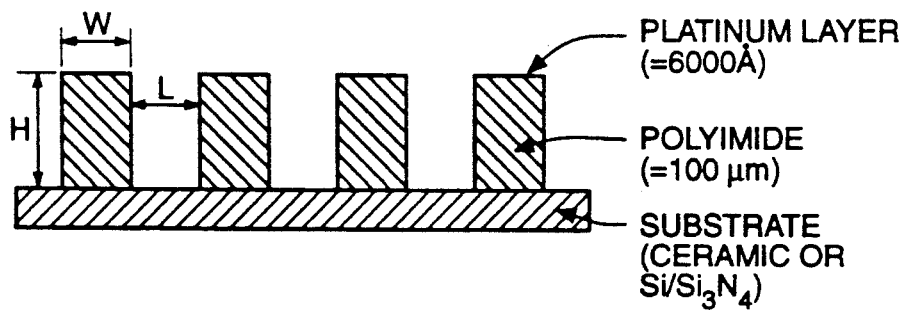
FIG._8

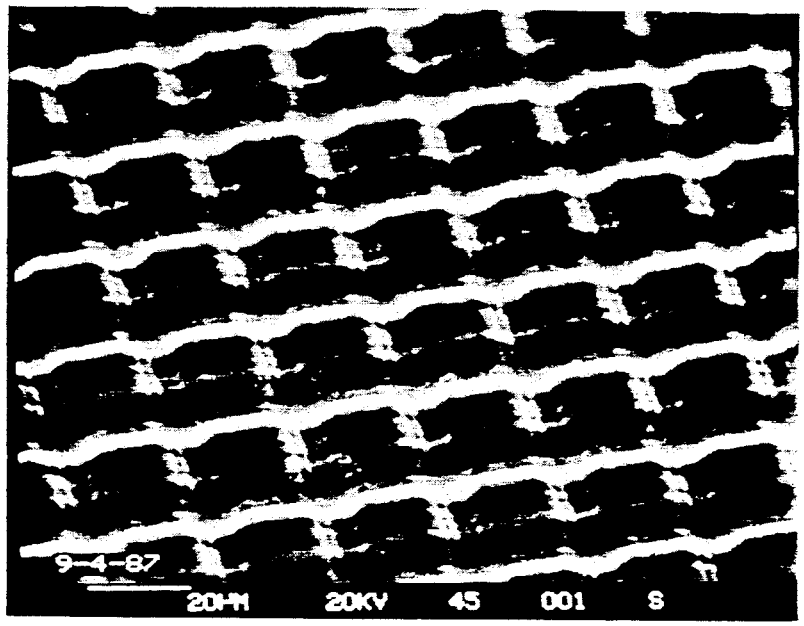
FIG._2A
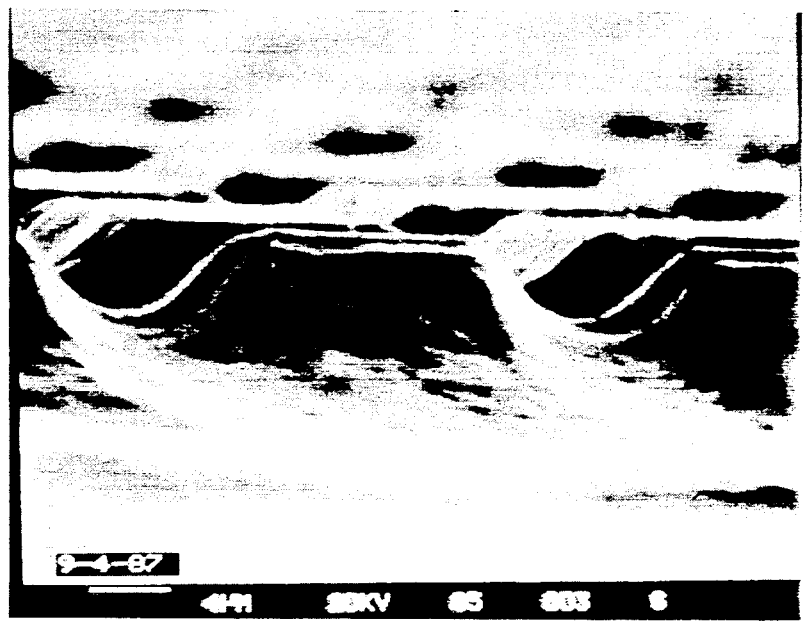
FIG._2B

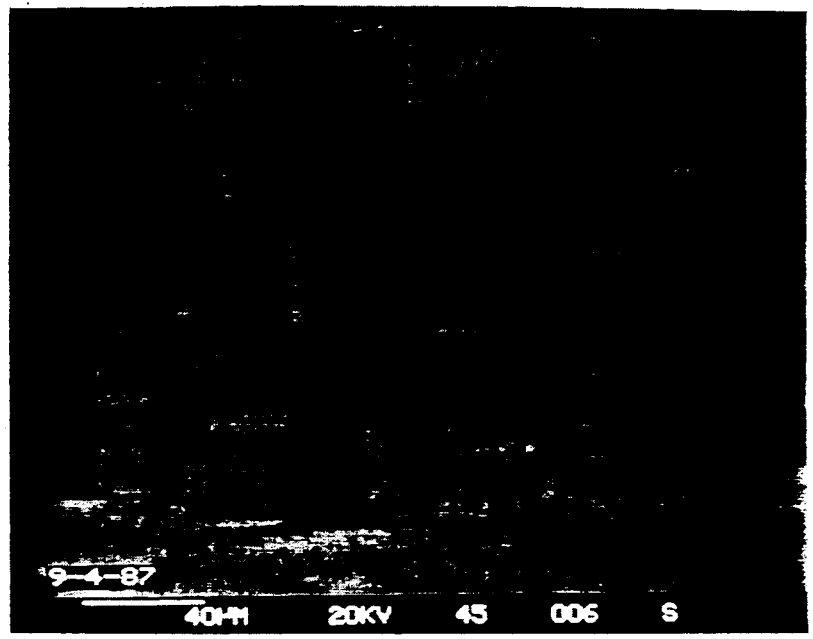
FIG._3A
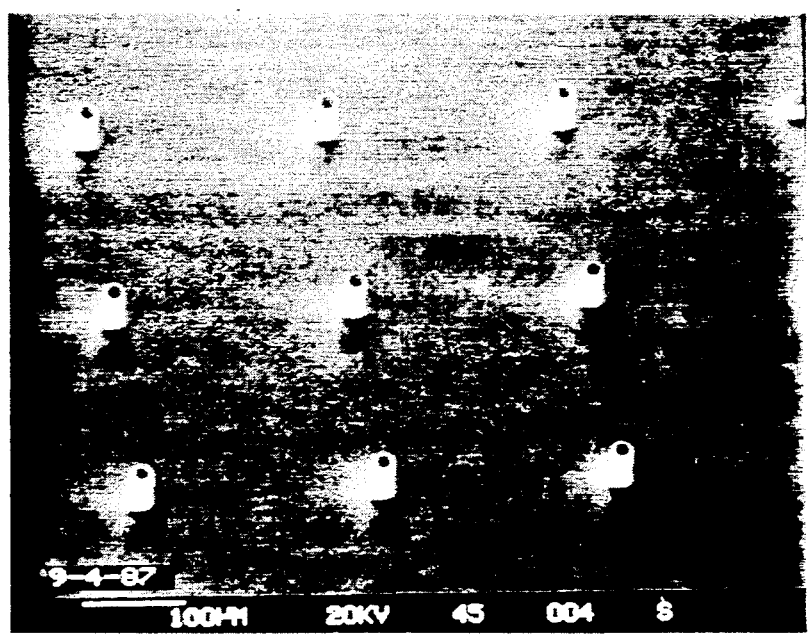
FIG._3B

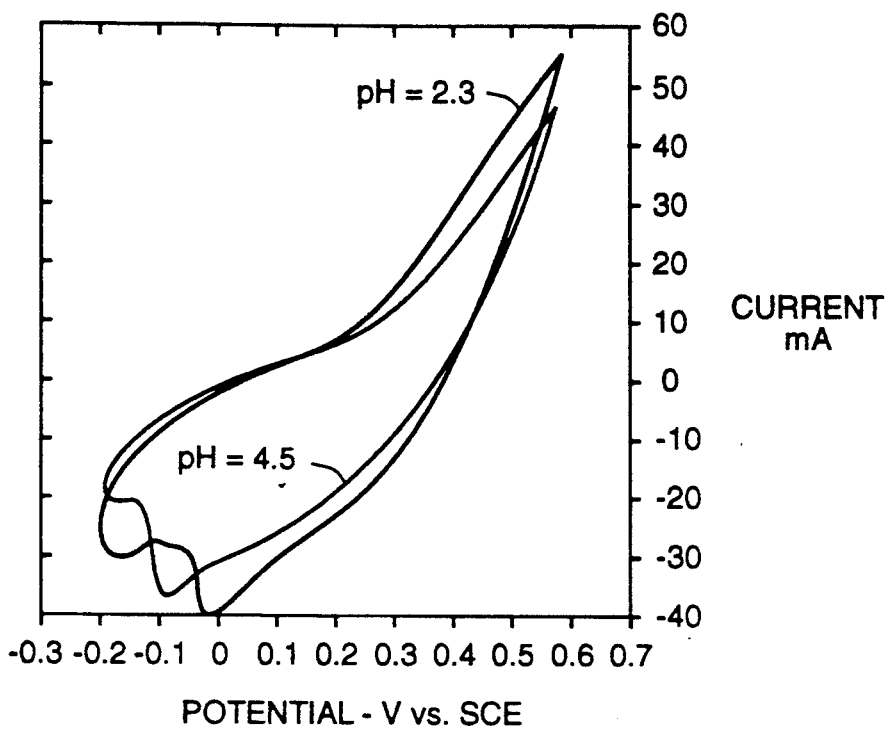
FIG._4A
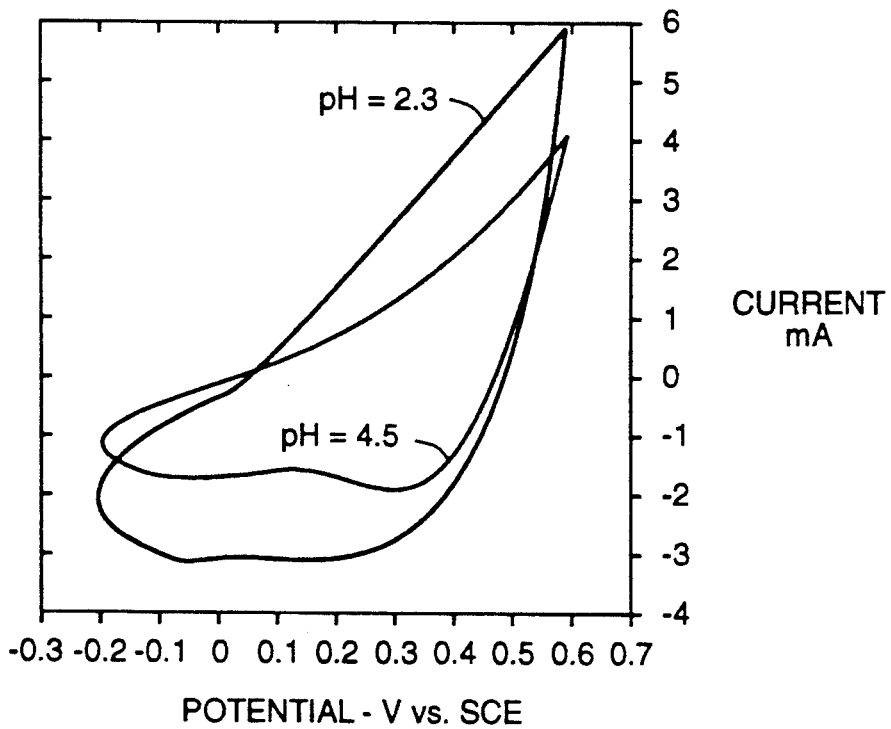
FIG._4B

FIG._5C
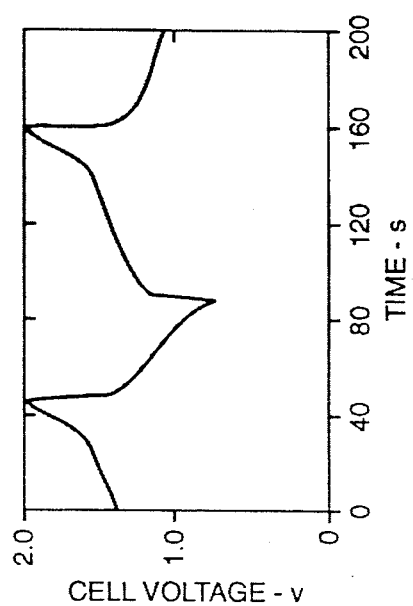
FIG._5D
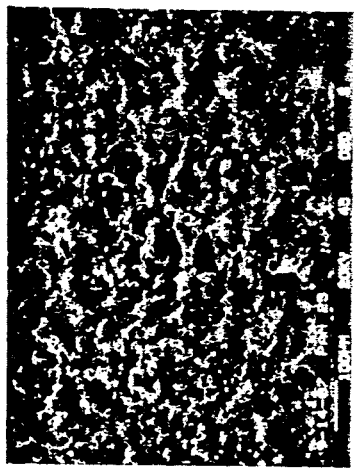
FIG._5A
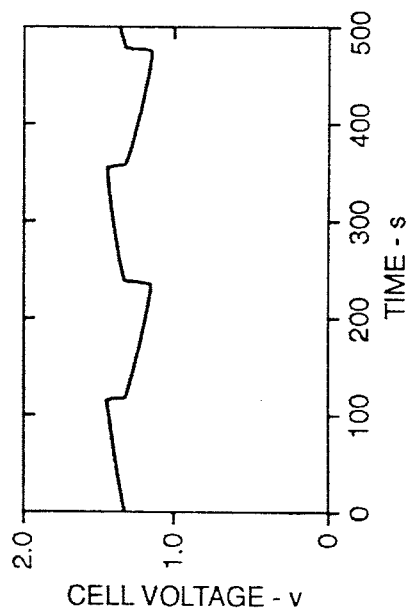
FIG._5B

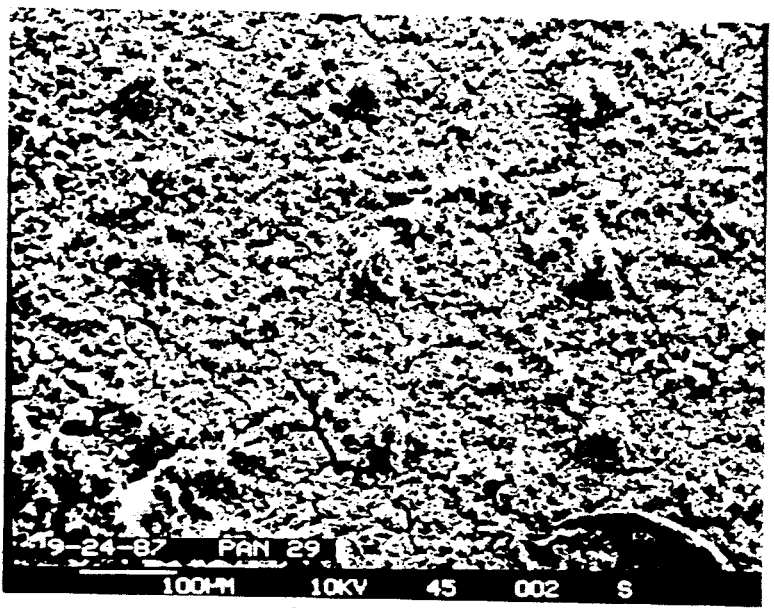
FIG._6A
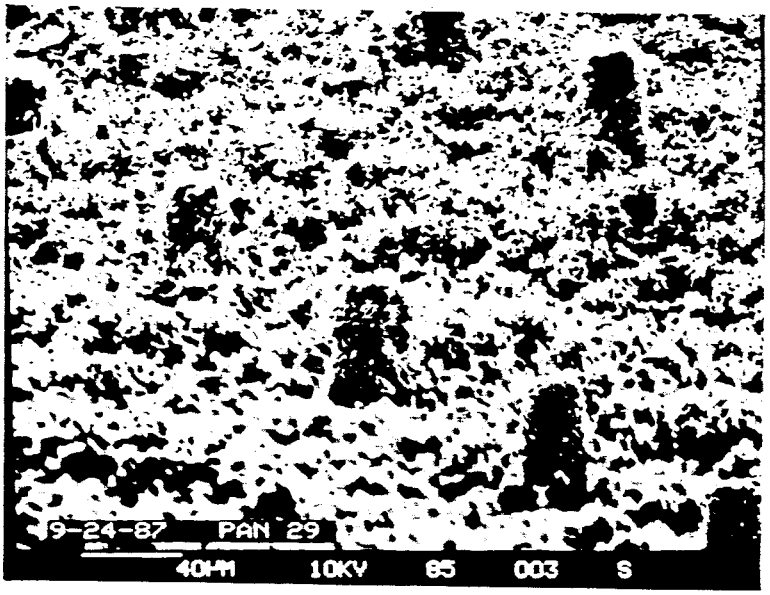
FIG._6B
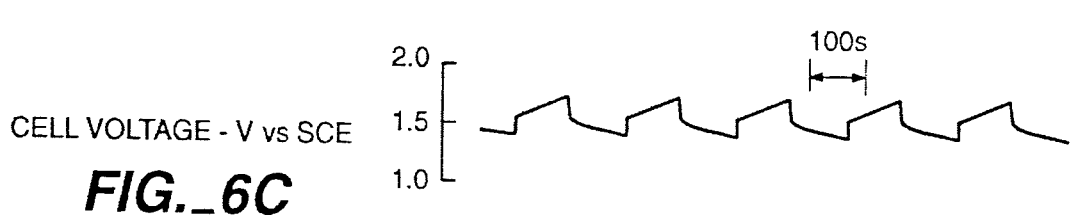
FIG._6C

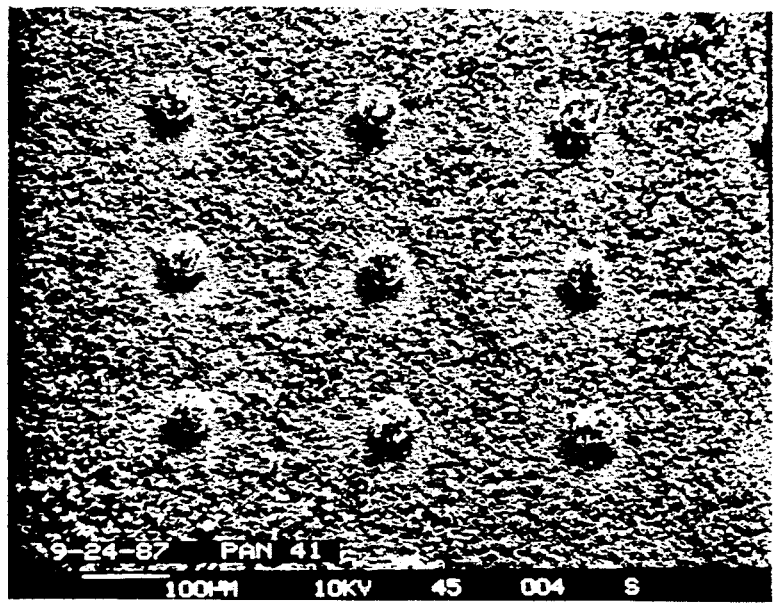
FIG._7A
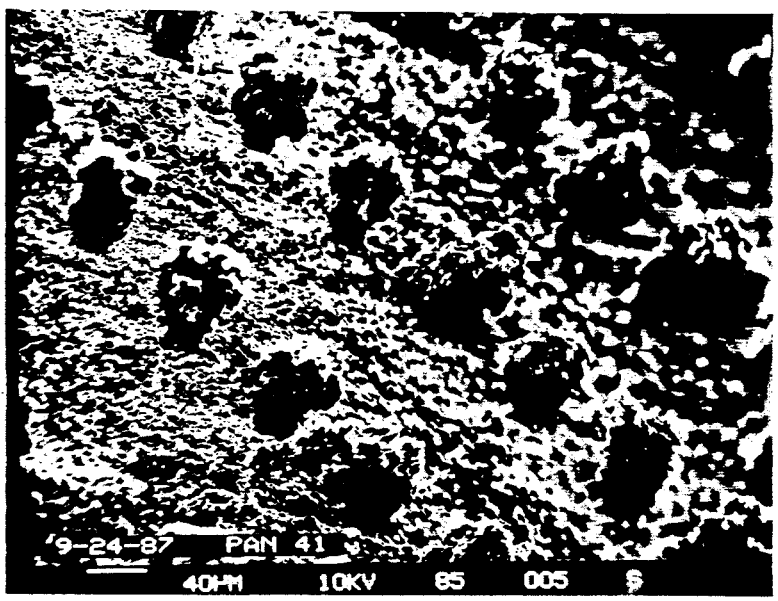
FIG._7B
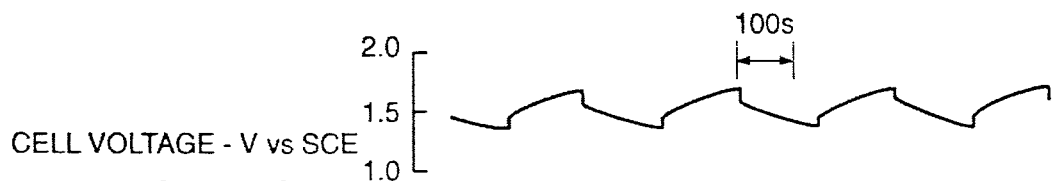
FIG._7C

FIG._9D
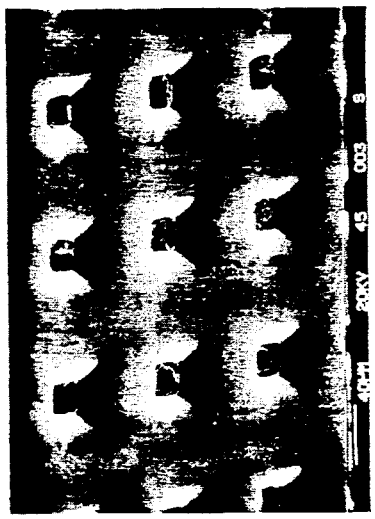
FIG._9B
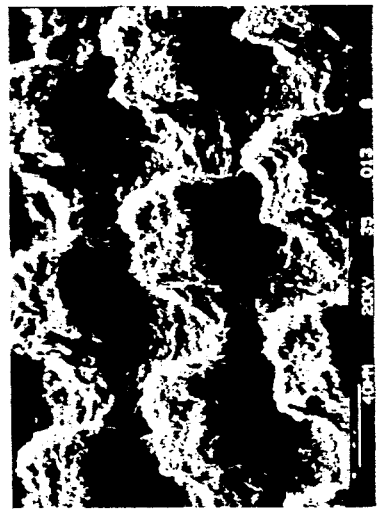
FIG._9C
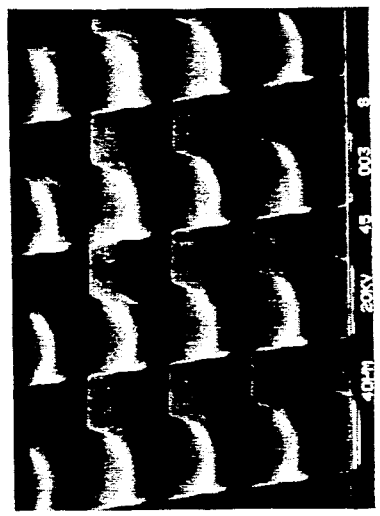
FIG._9A

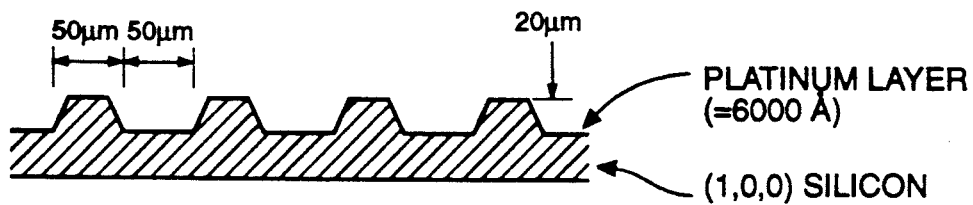
FIG._10A
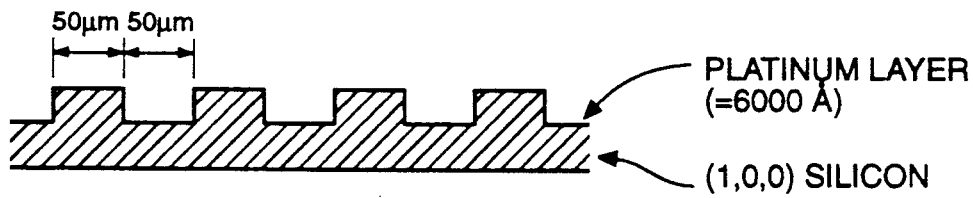
FIG._10B
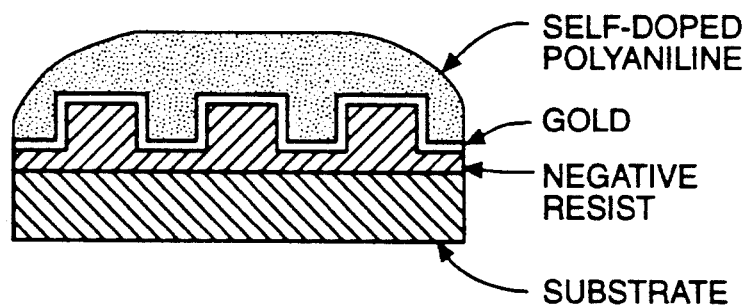
FIG._18

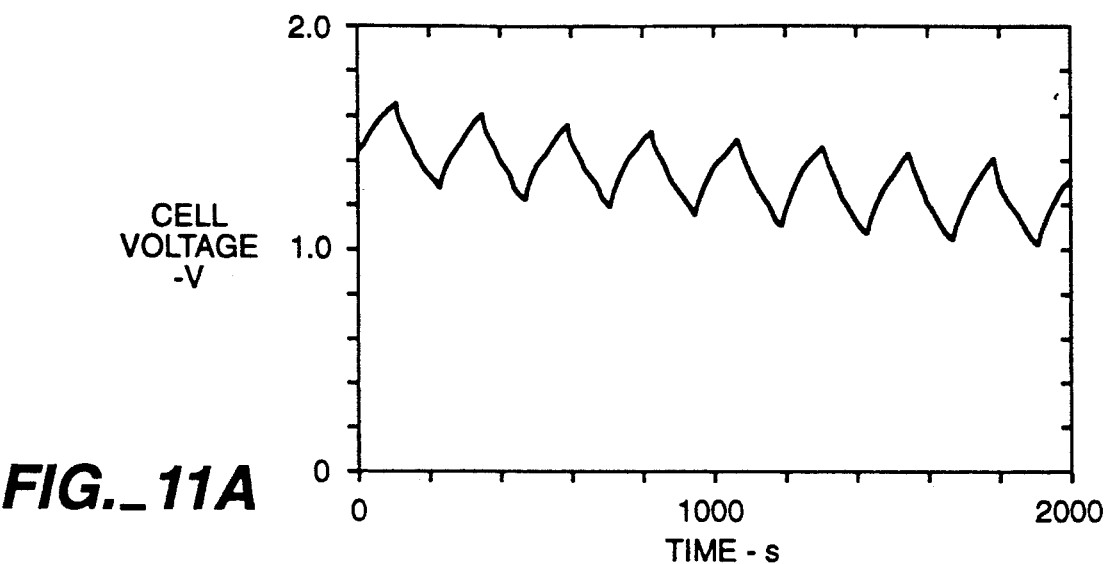
FIG._11A
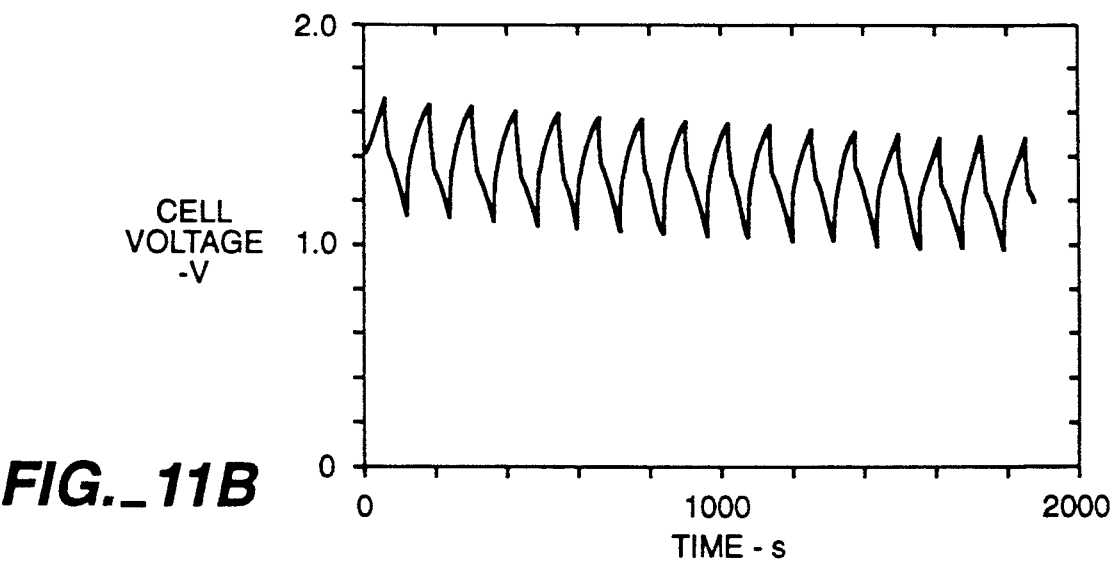
FIG._11B
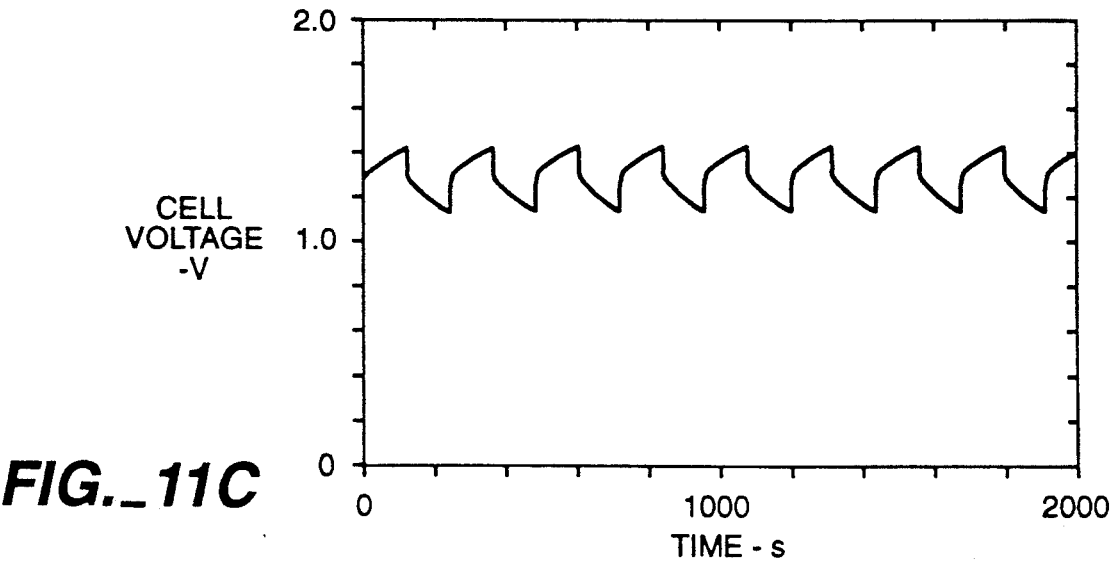
FIG._11C

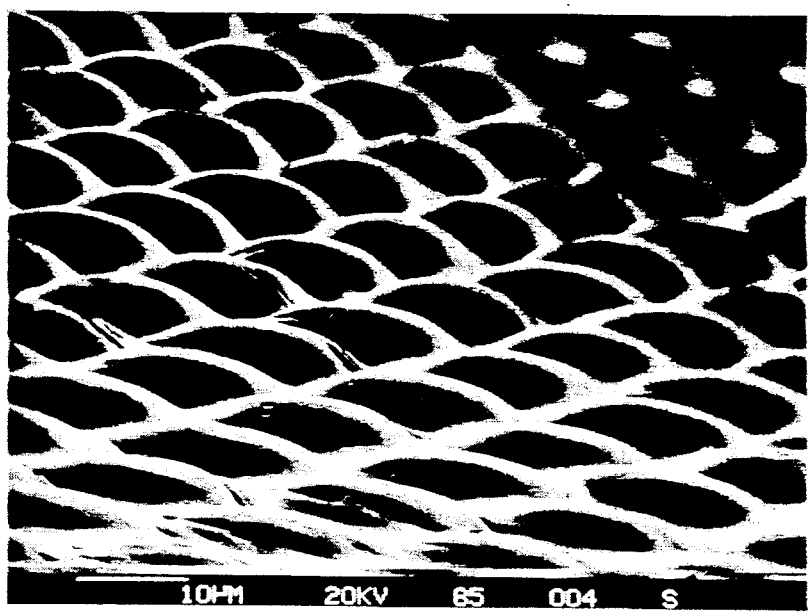
FIG._12A
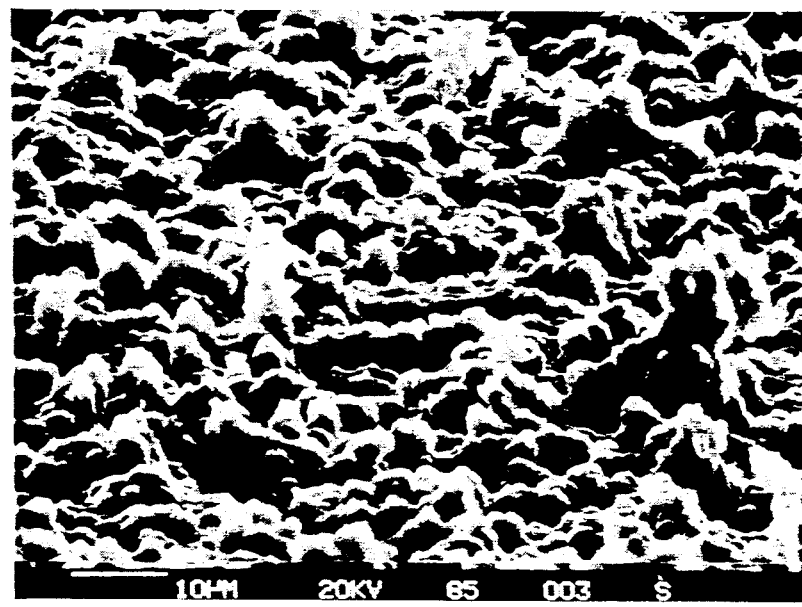
FIG._12B

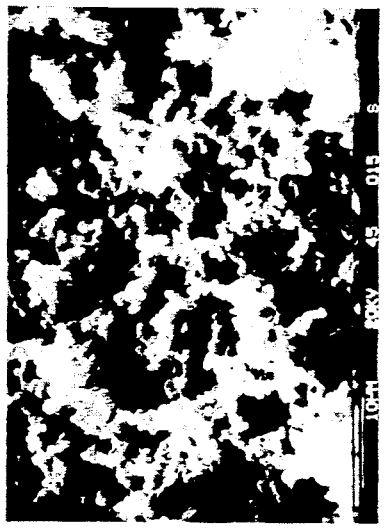
FIG._13B
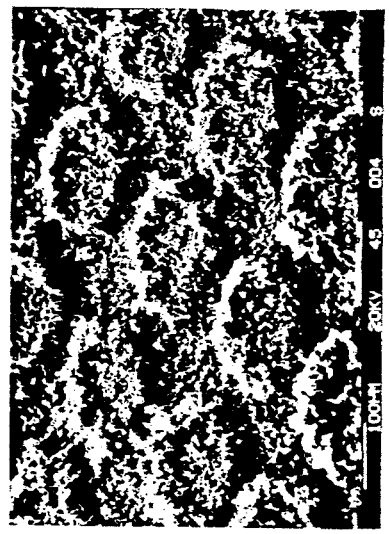
FIG._13D
FIG._13A
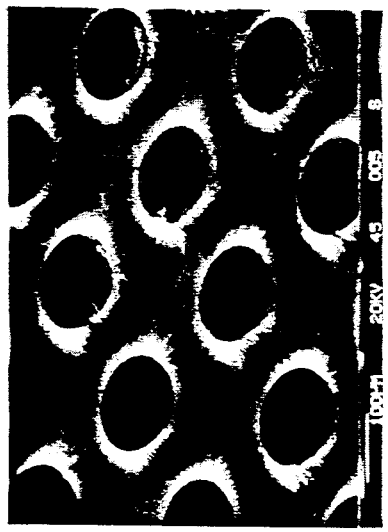
FIG._13C

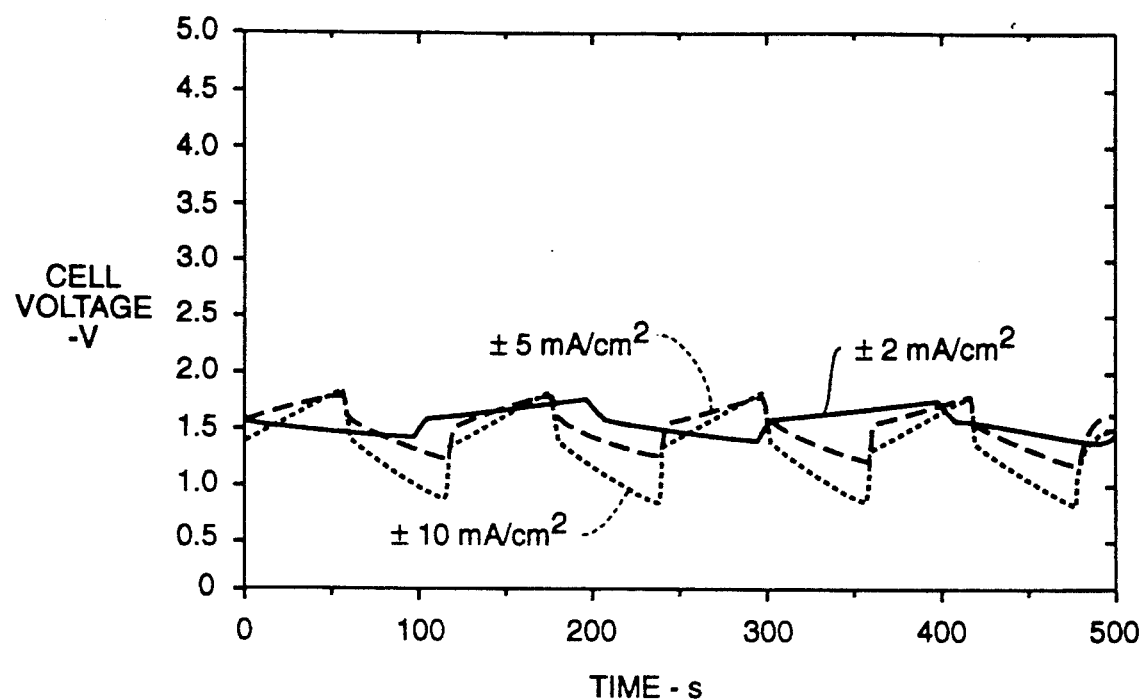
FIG._14A
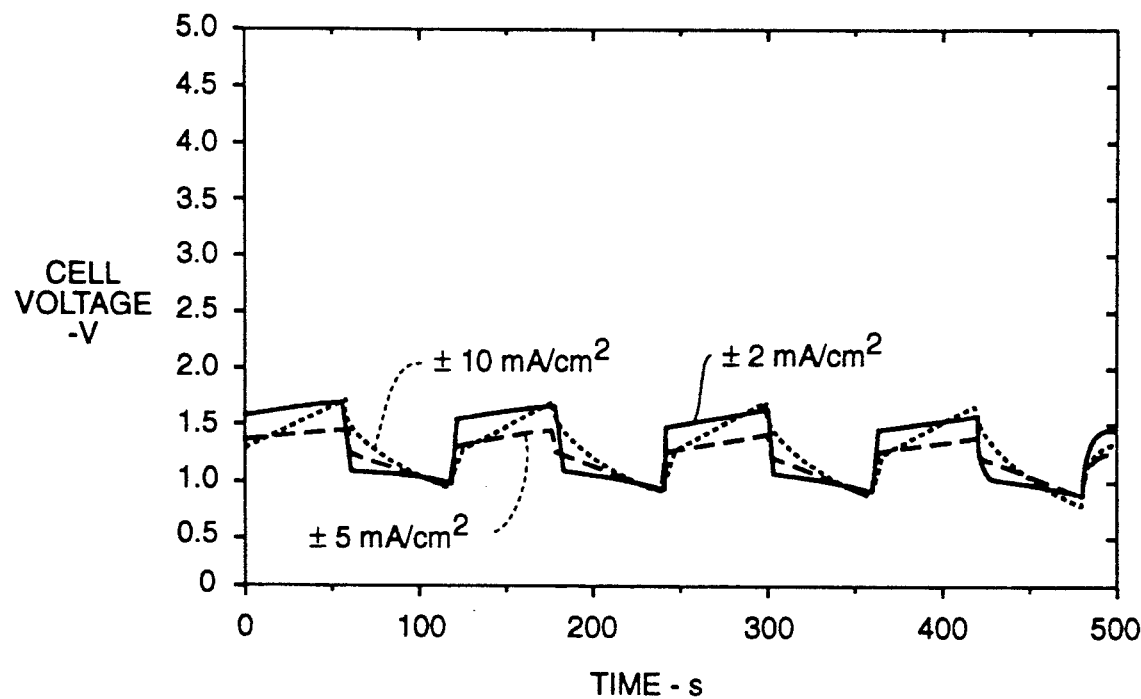
FIG._14B

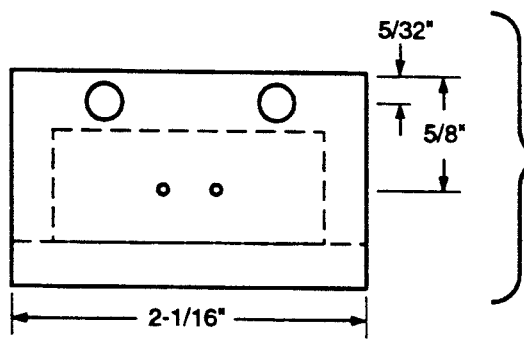
FIG._15A-1
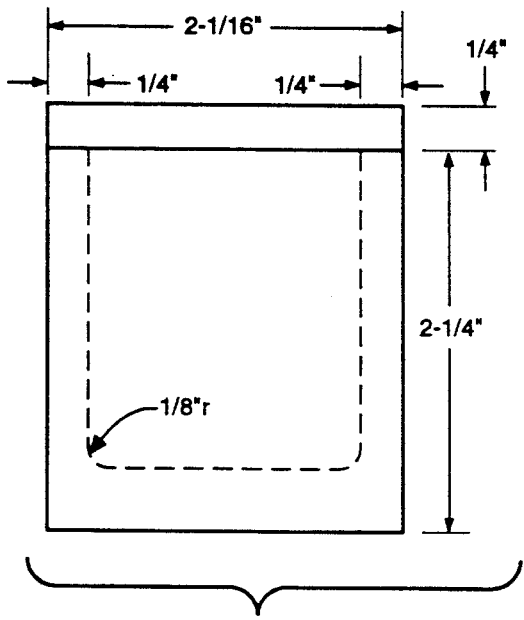
FIG._15A-2
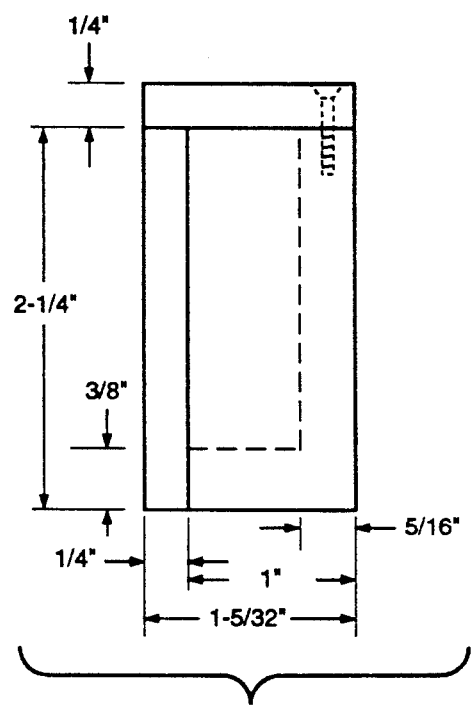
FIG._15A-3
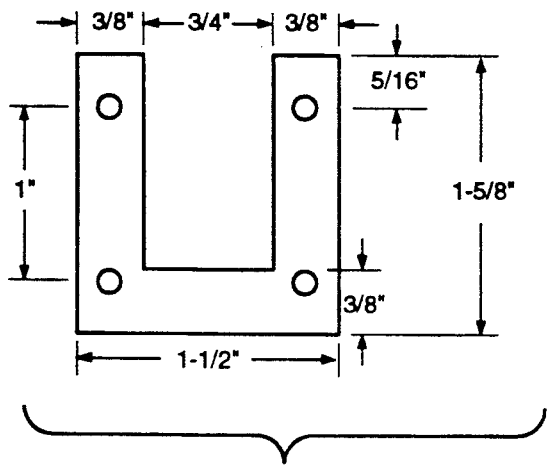
FIG._15B-1
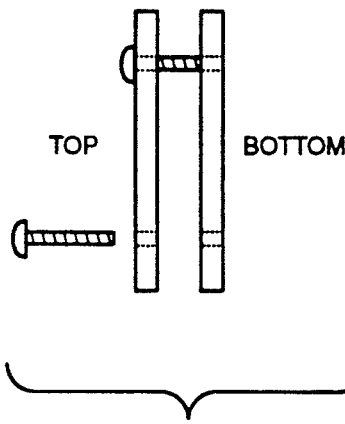
FIG._15B-2

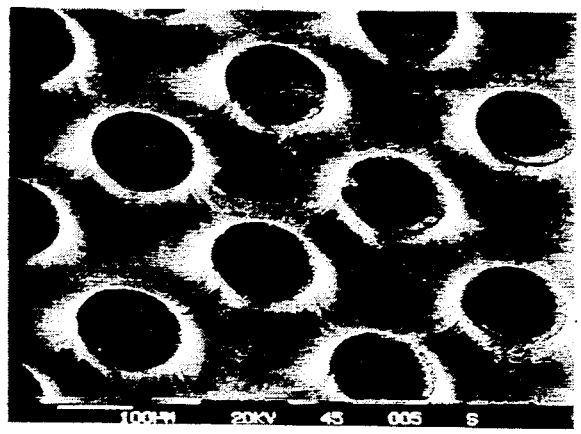
FIG._16A
FIG._16B

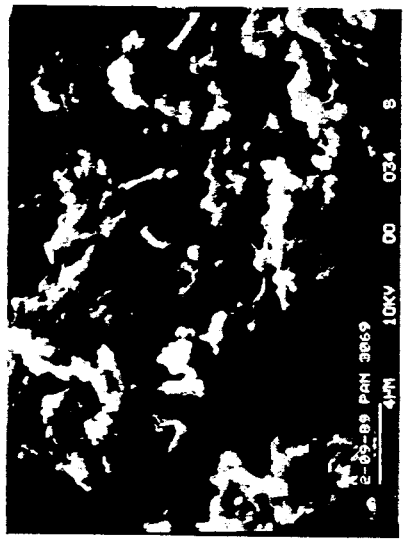
FIG._17B
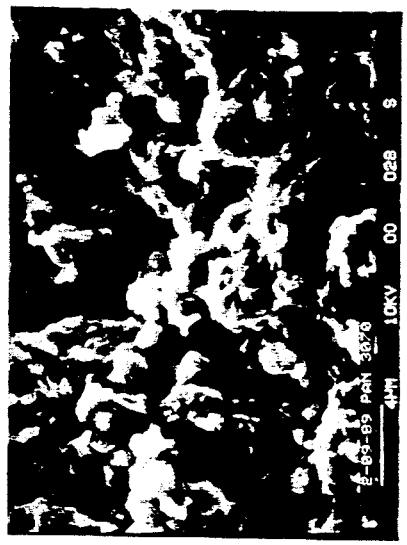
FIG._17D
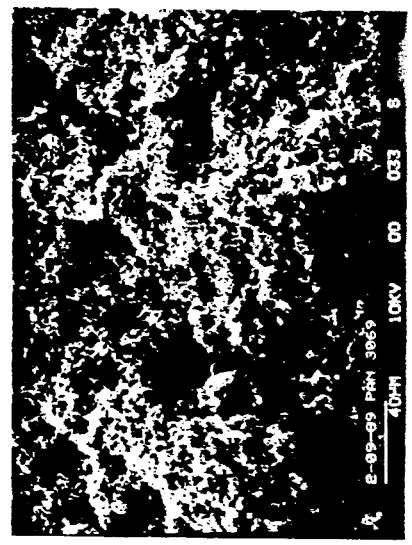
FIG._17A
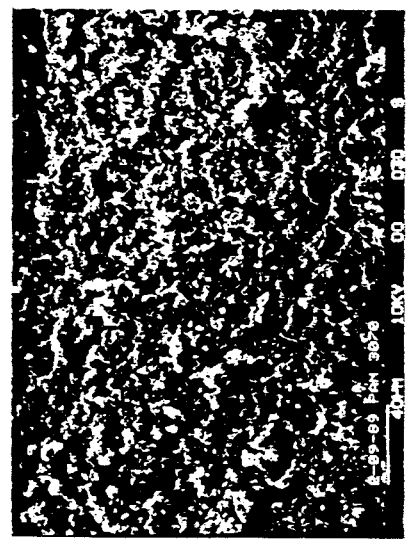
FIG._17C

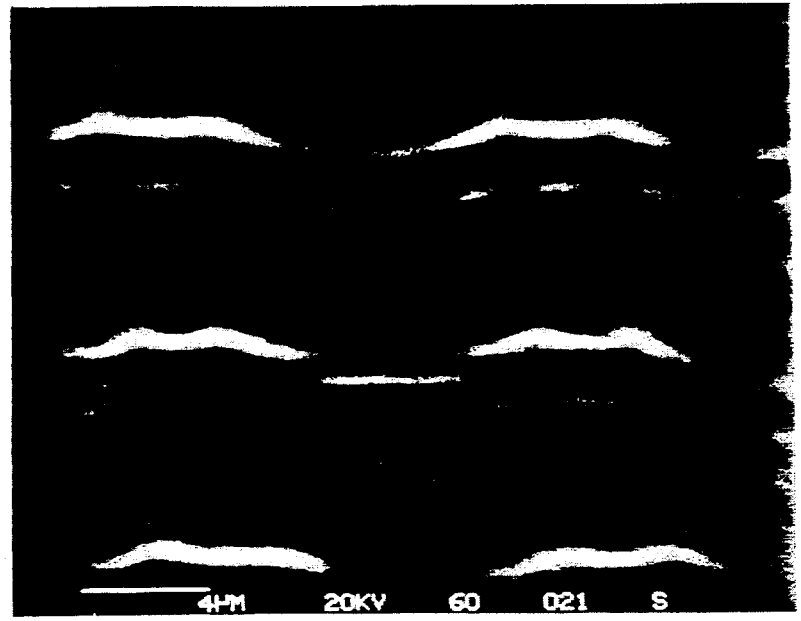
FIG._19A
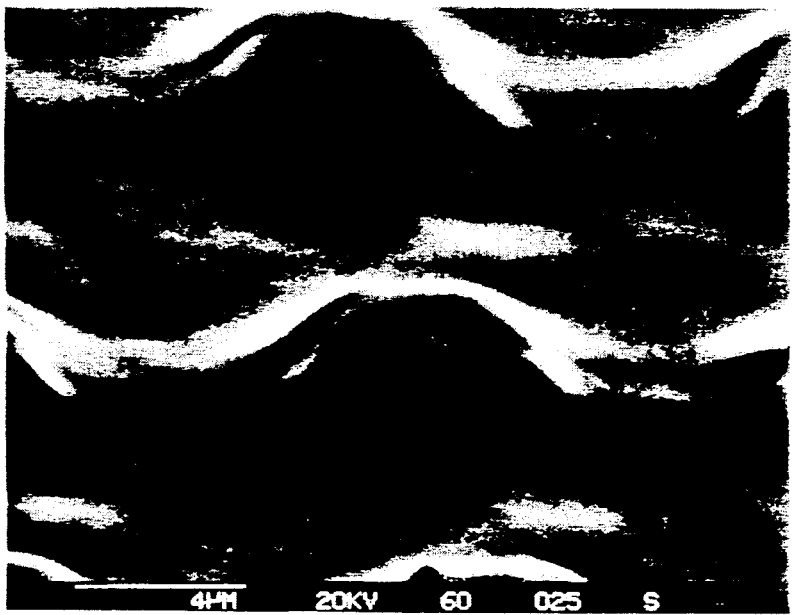
FIG._19B

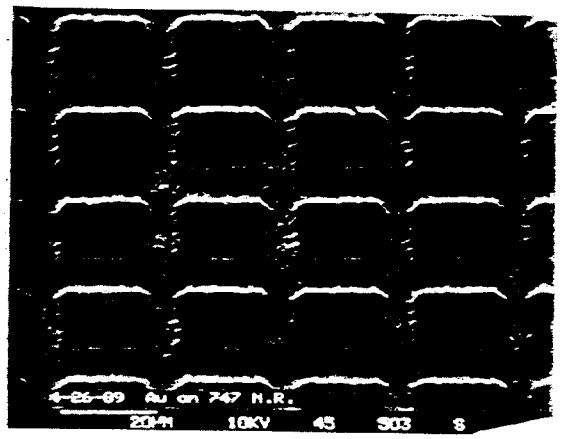
FIG._20A
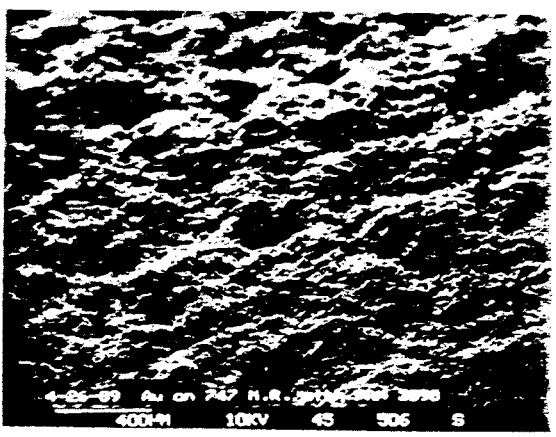
FIG._20B
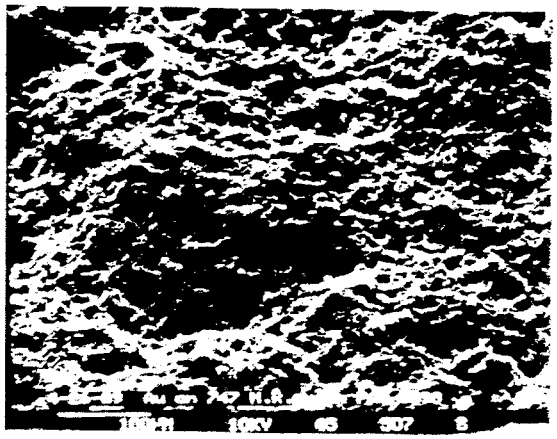
FIG._20C

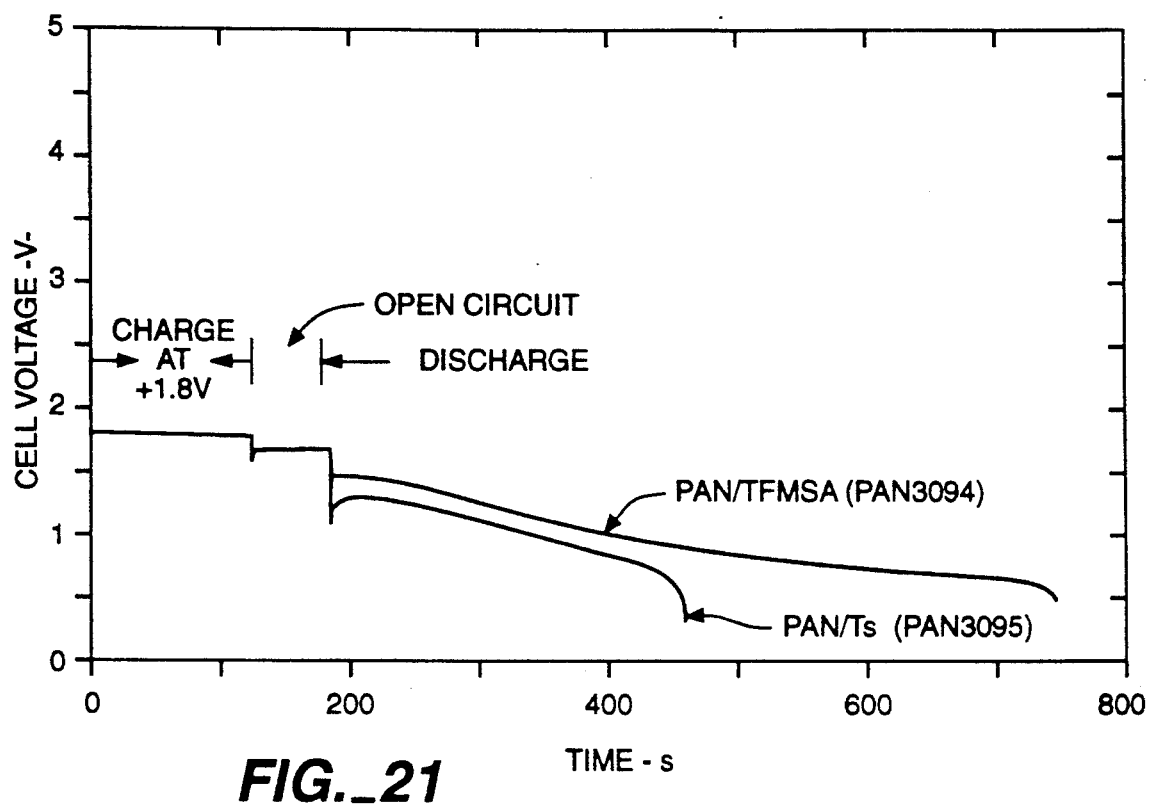
FIG._21
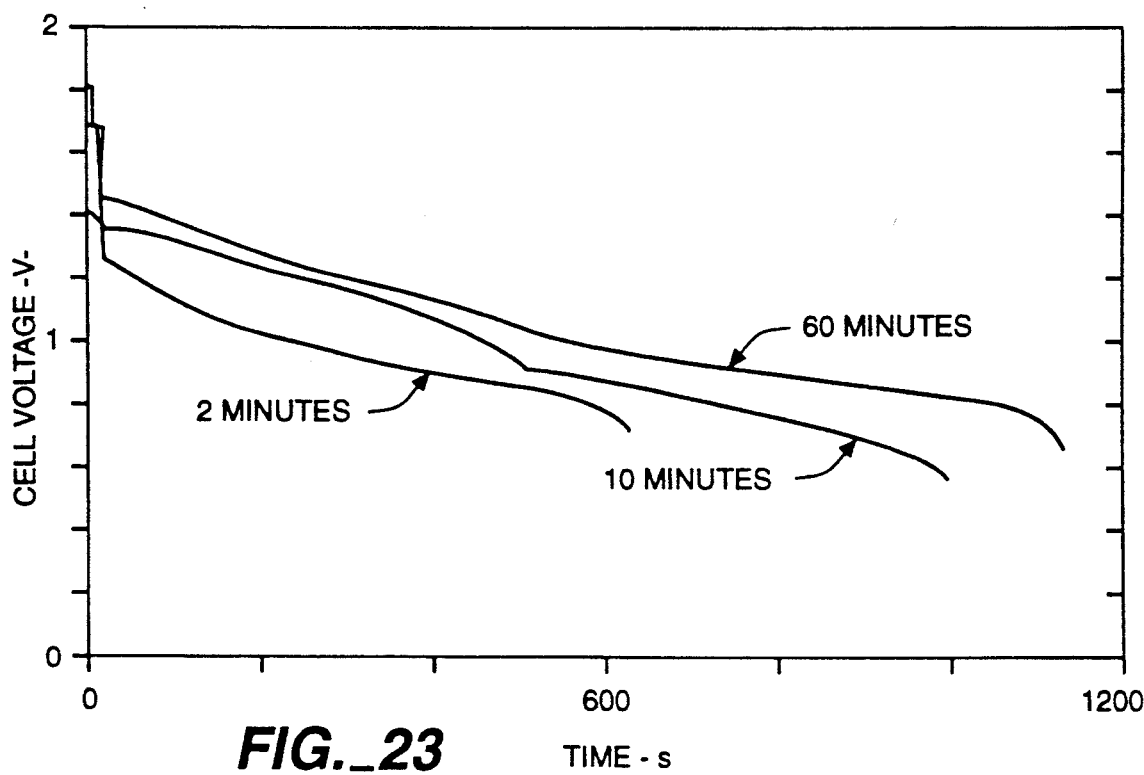
FIG._23

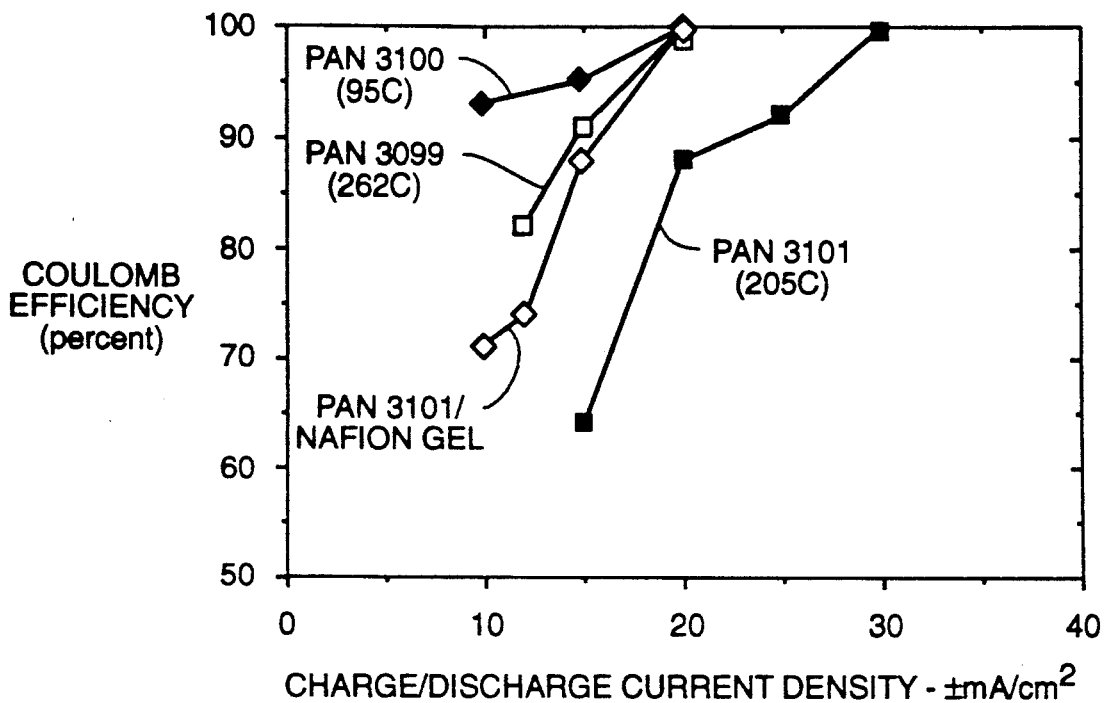
FIG._22A
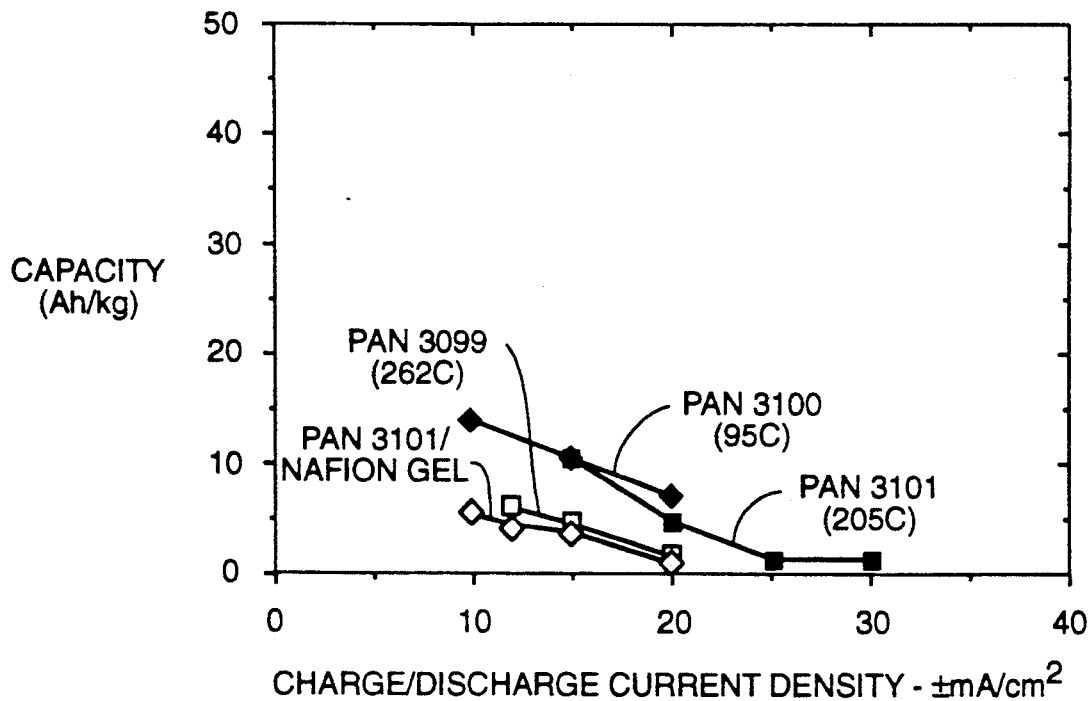
FIG._22B

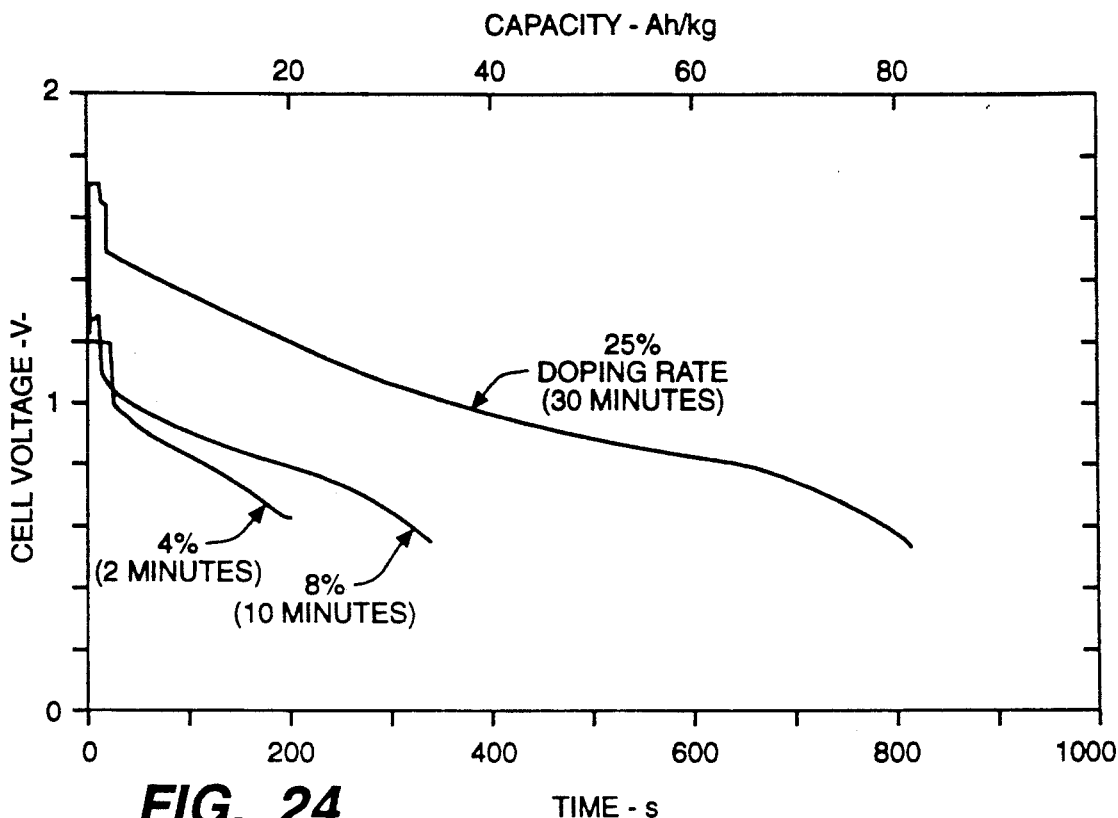
FIG._24
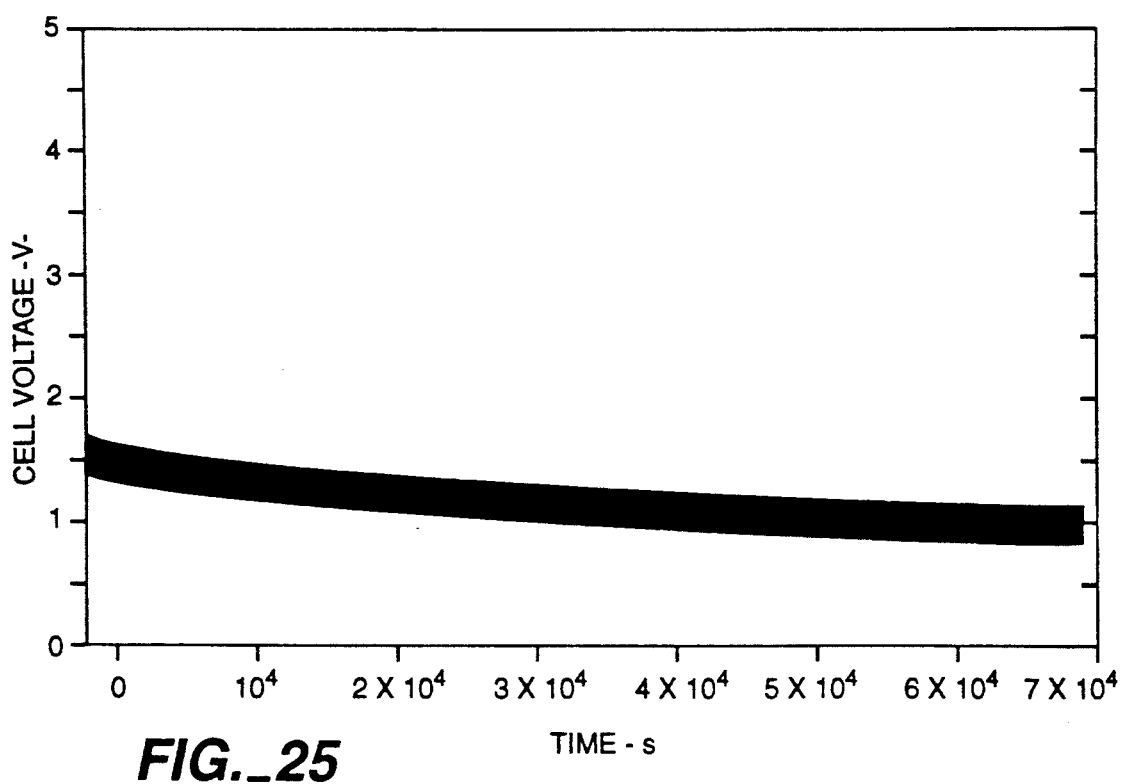
FIG._25

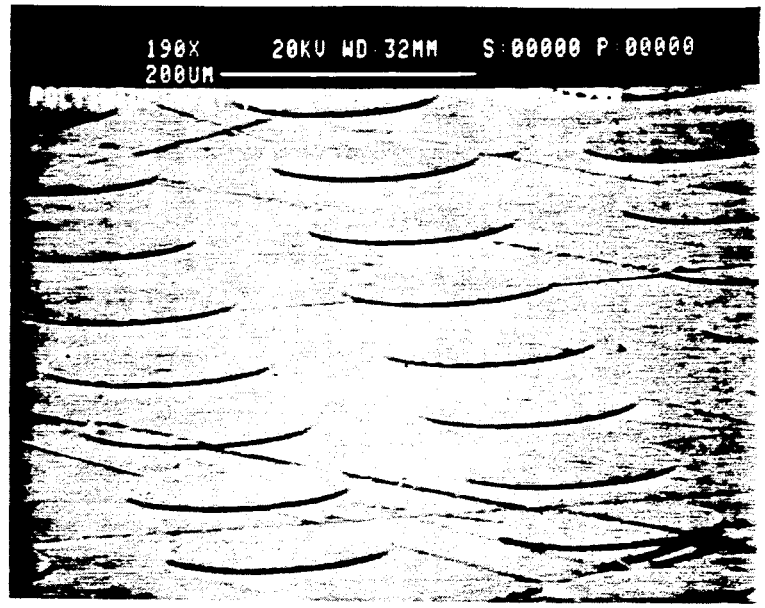
*FIG._26A*
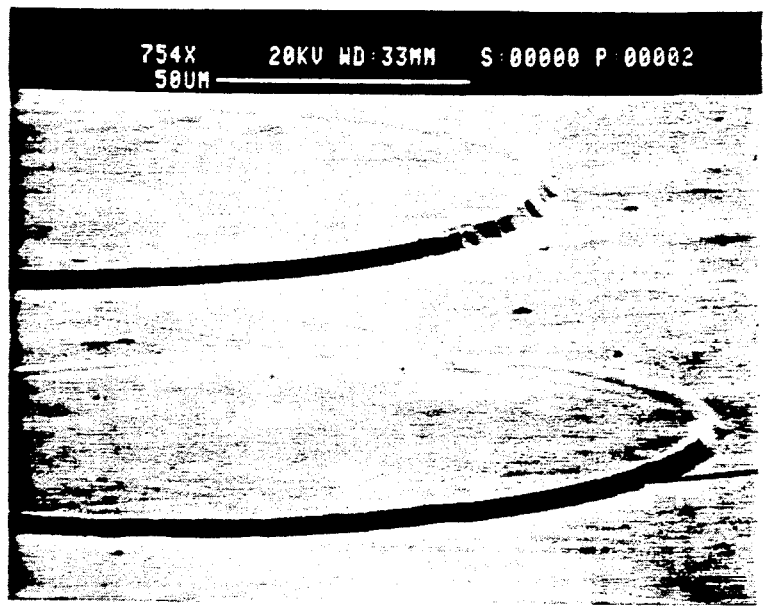
*FIG._26B*

FIG._27A
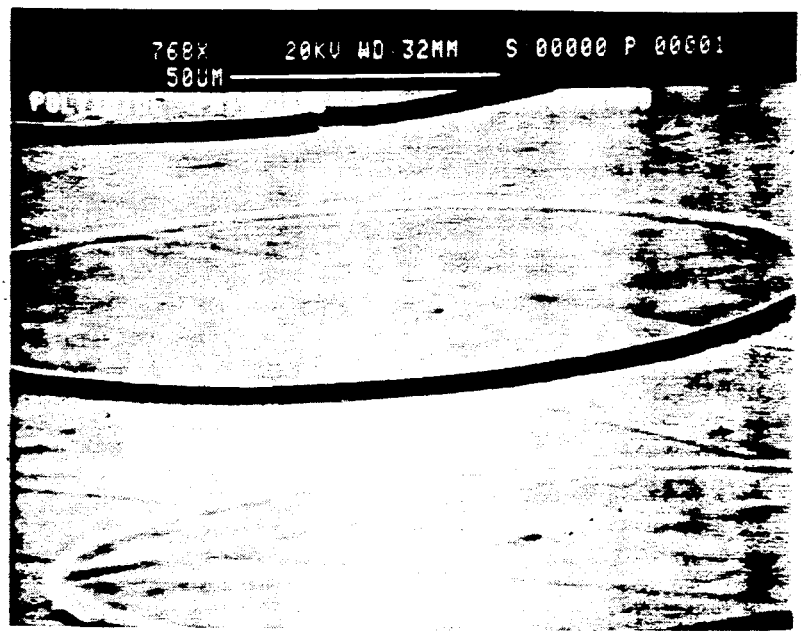
FIG._27B

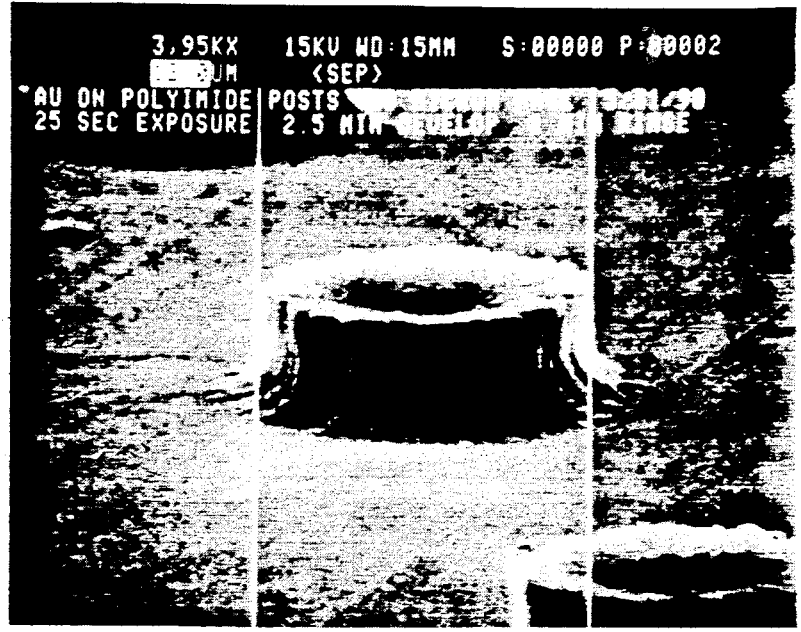
FIG._28A
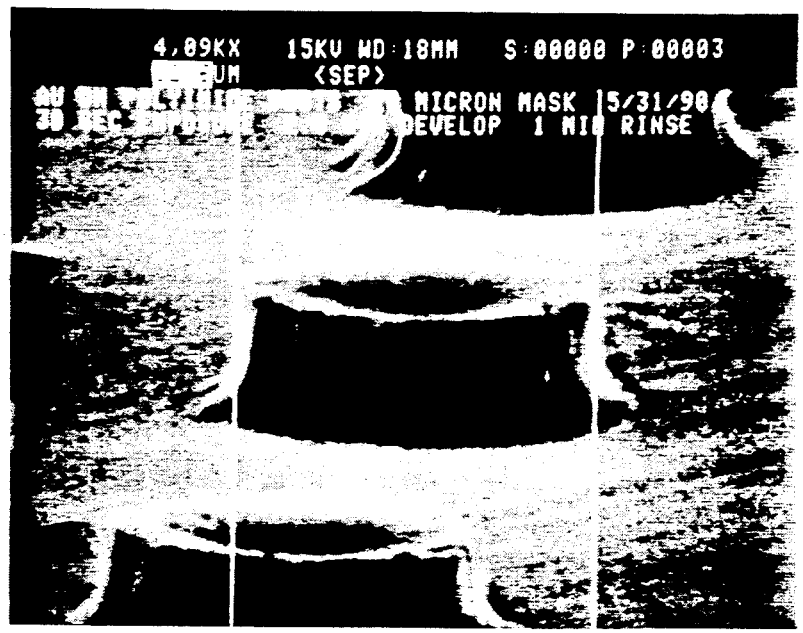
FIG._28B

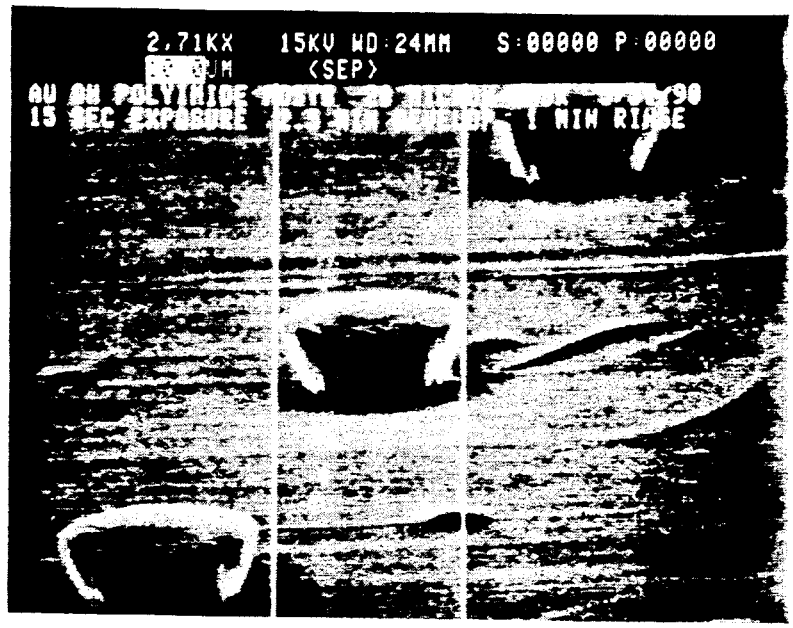
*FIG._29A*
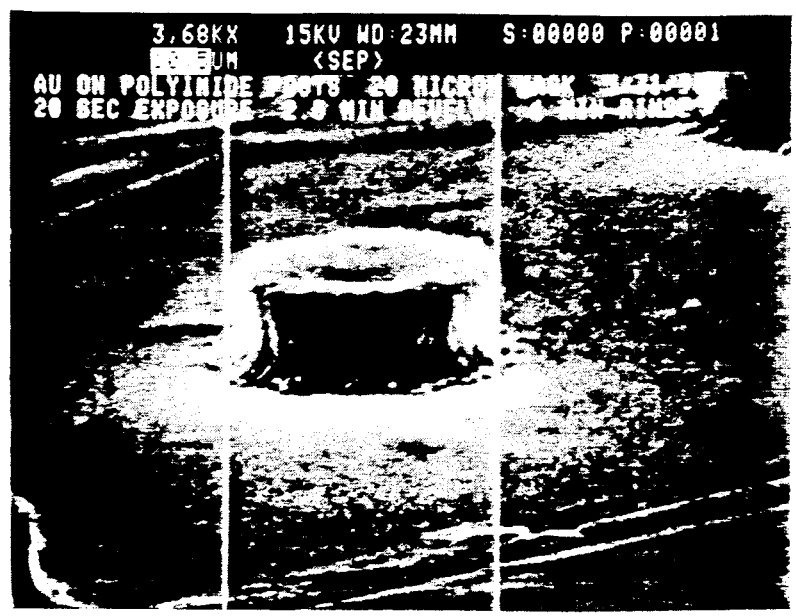
*FIG._29B*

FIG._30A
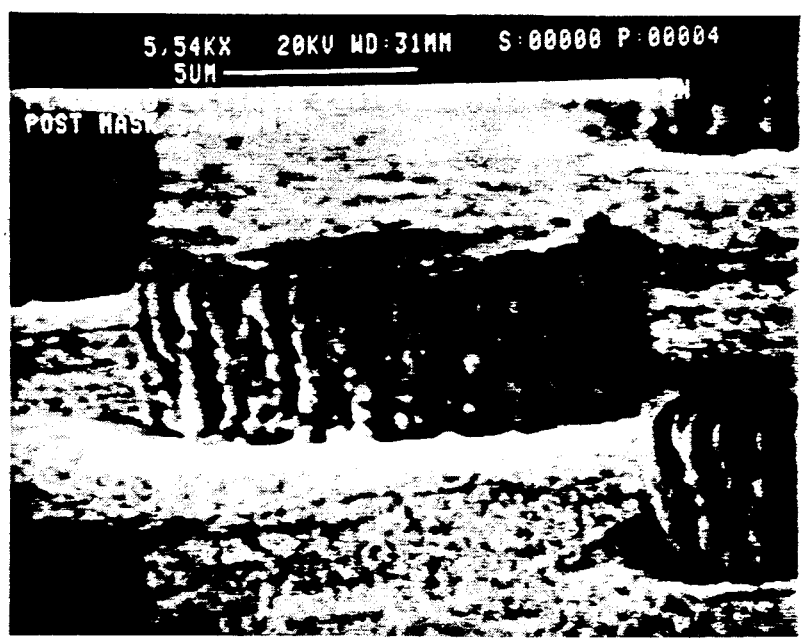
FIG._30B

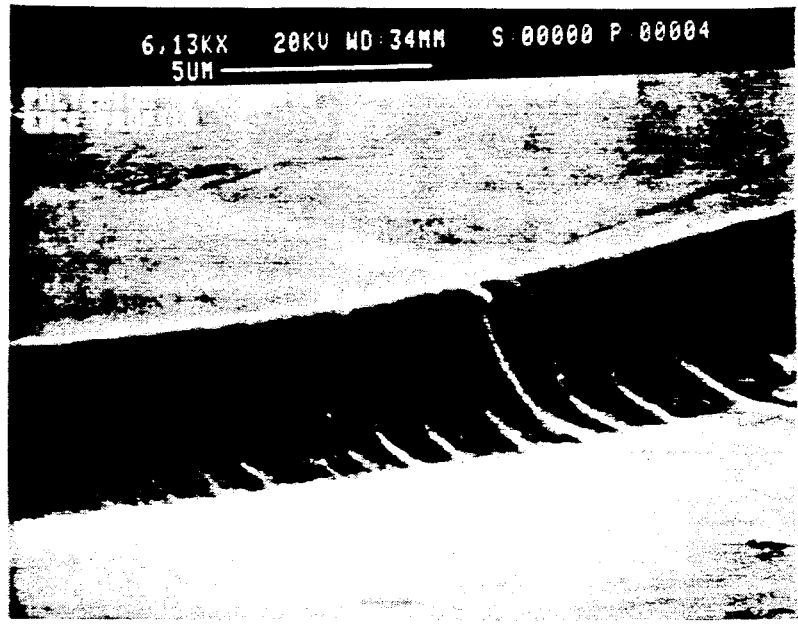
FIG._31
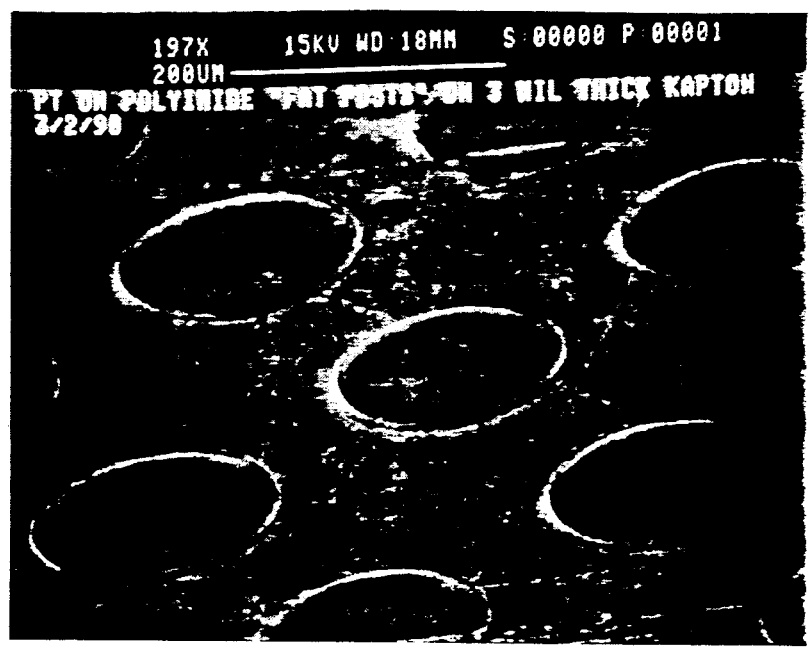
FIG._38

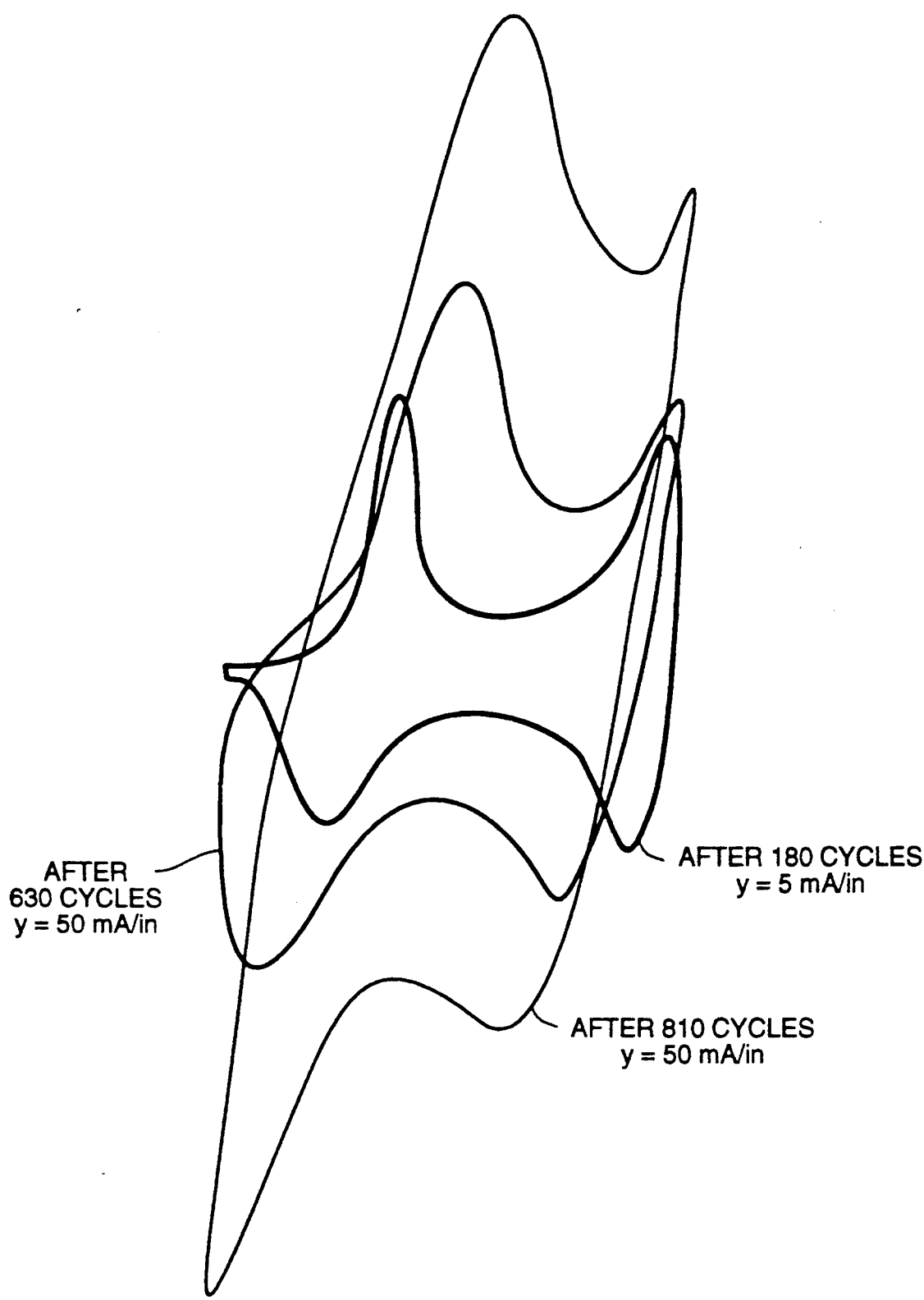
FIG._32

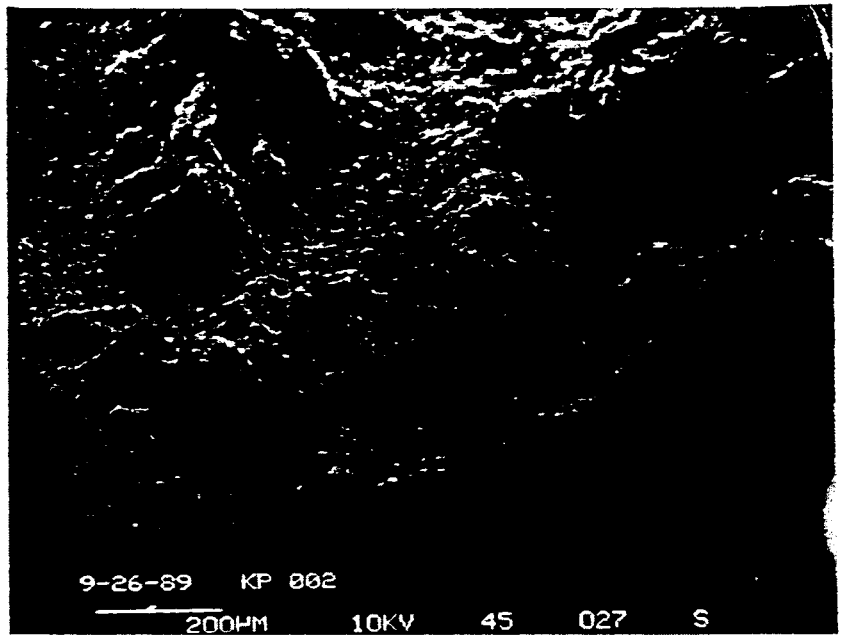
FIG._33A
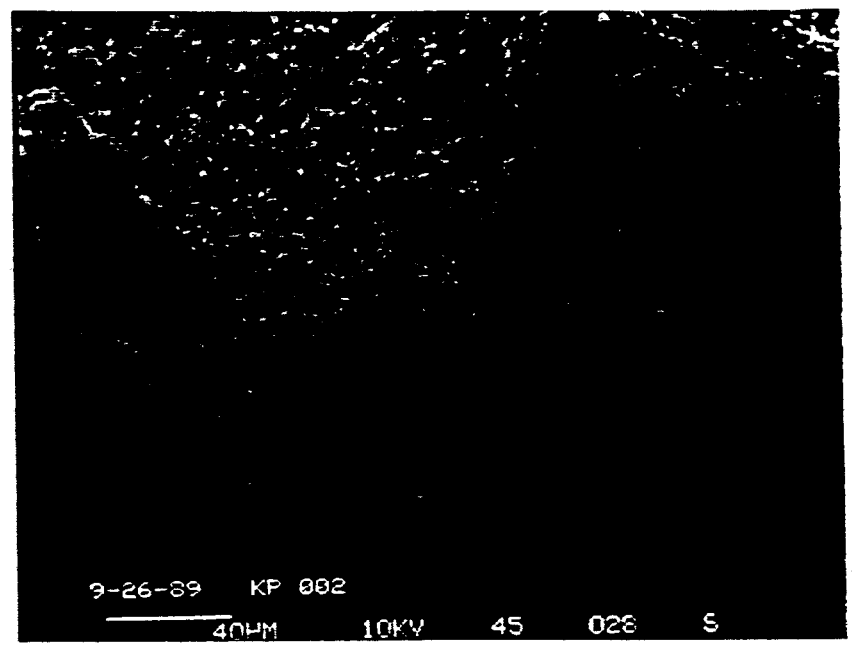
FIG._33B

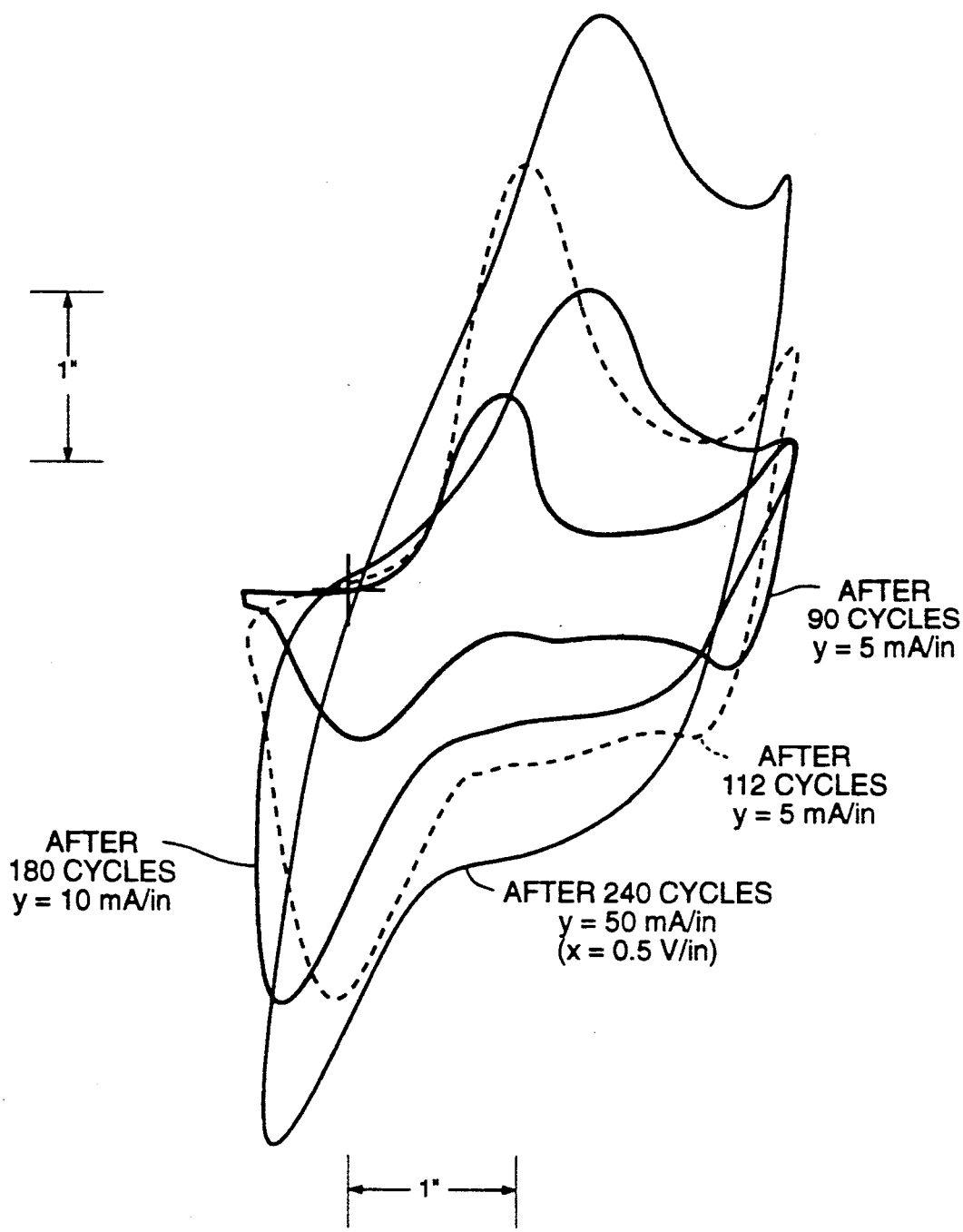
FIG._34

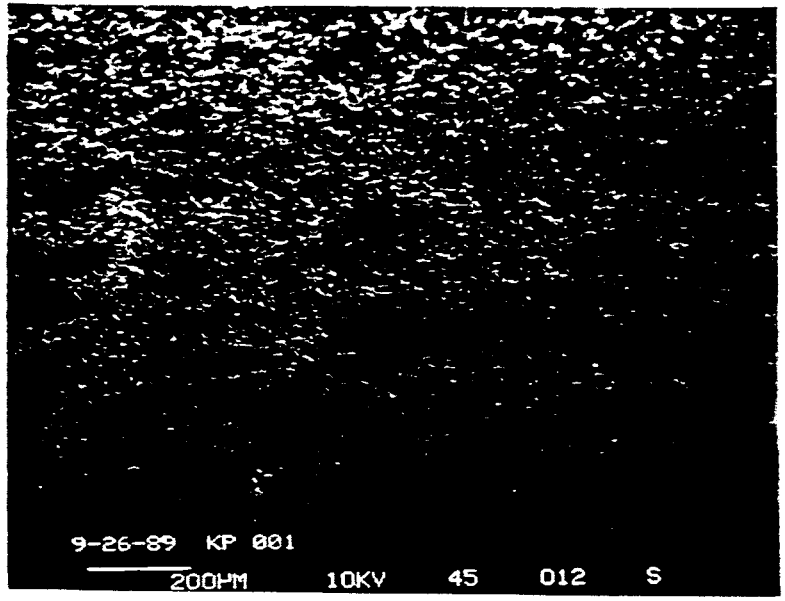
FIG._35A
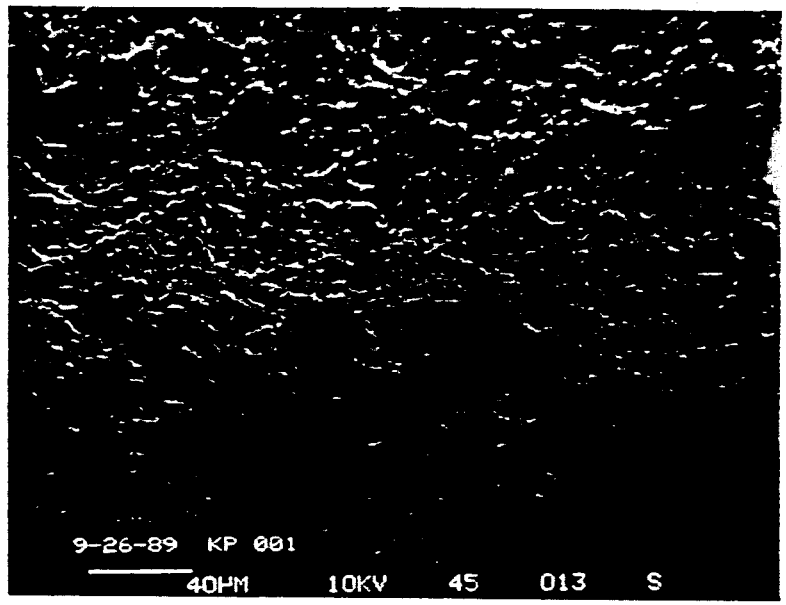
FIG._35B

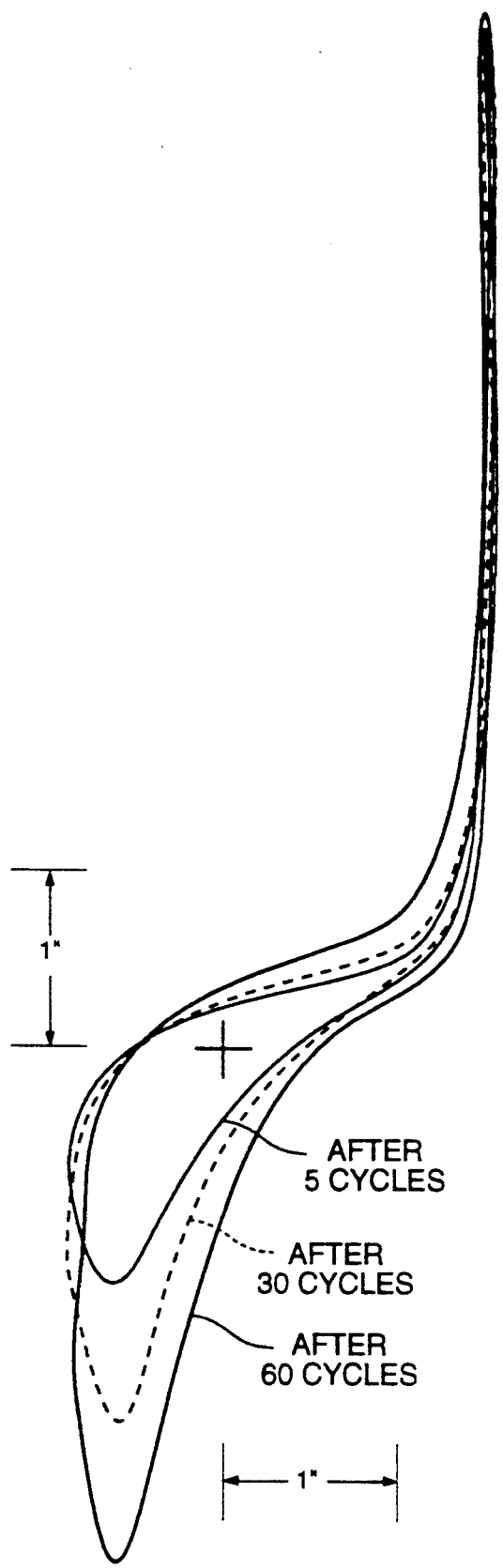
FIG._36A

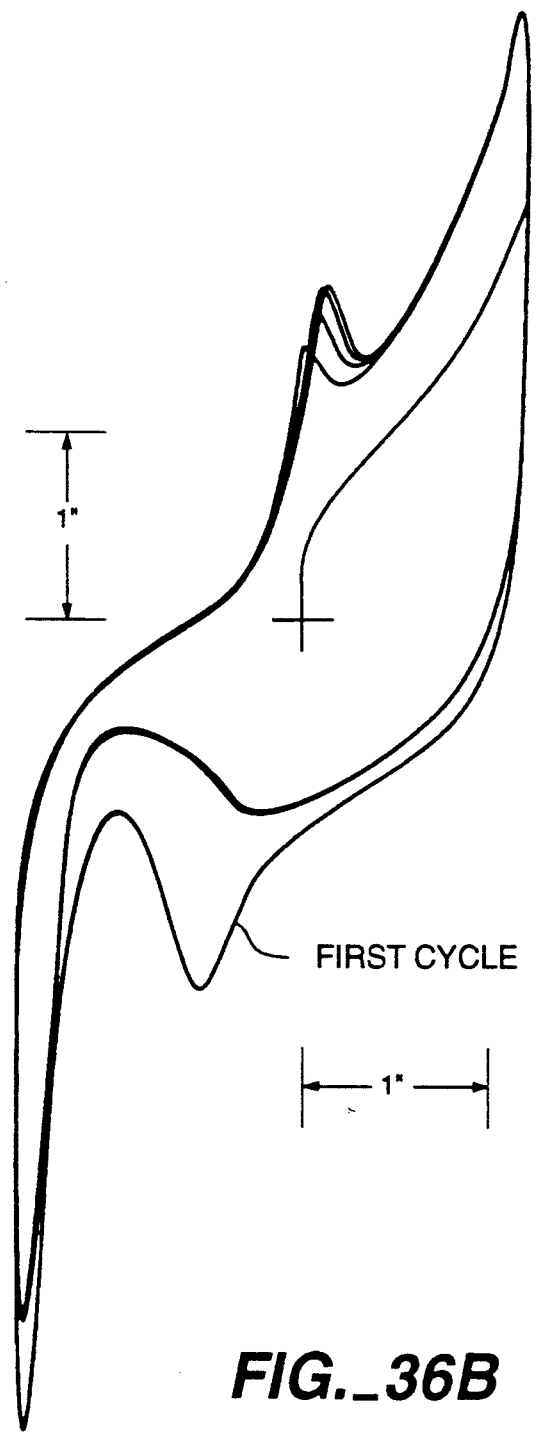
FIG._36B

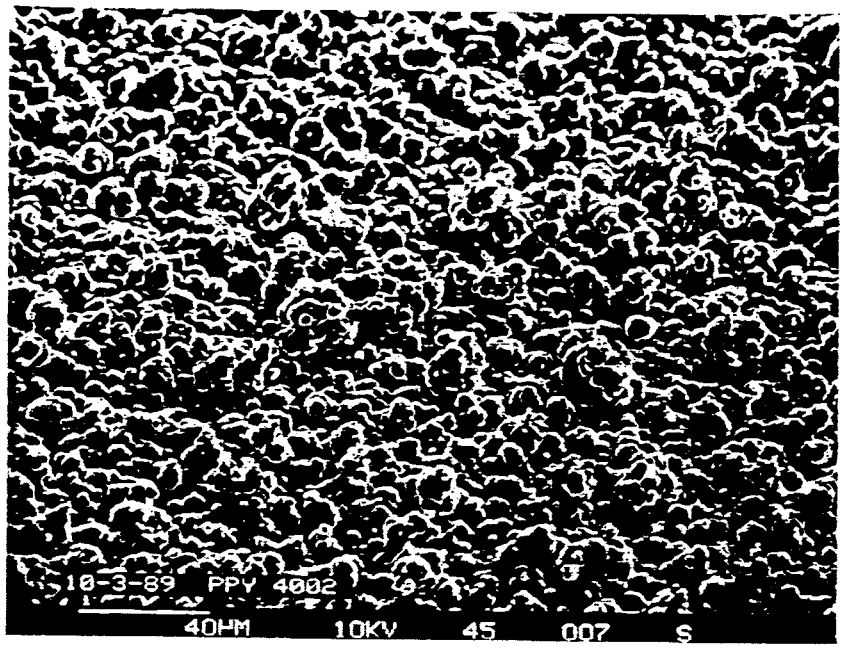
FIG._37A
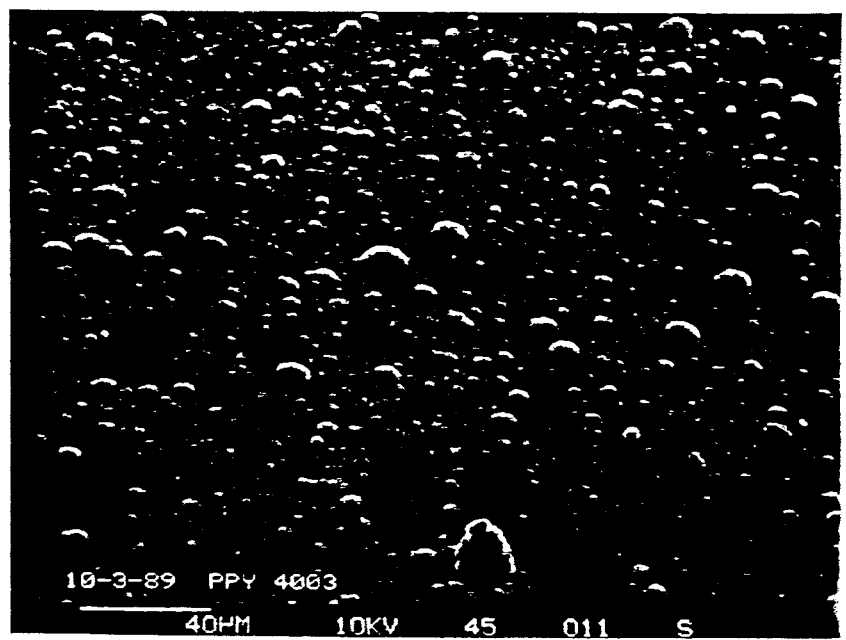
FIG._37B

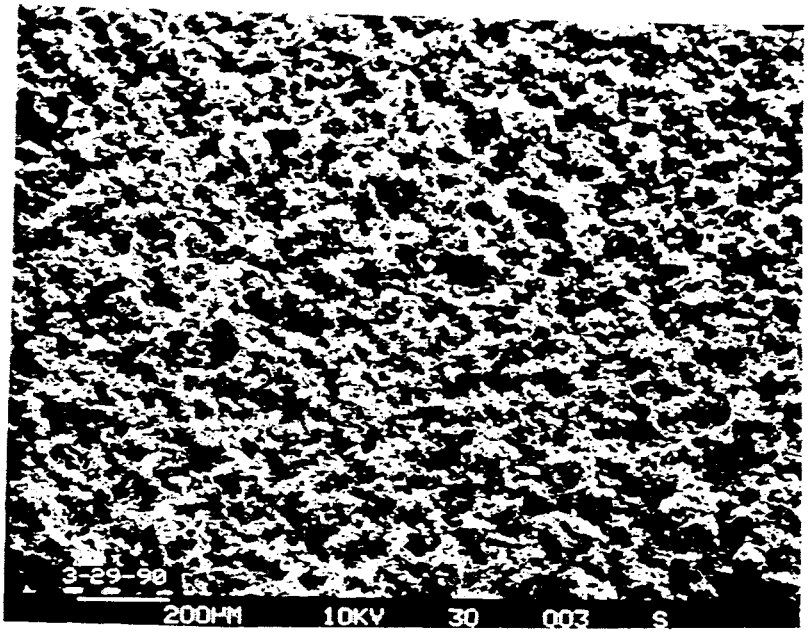
FIG._39A
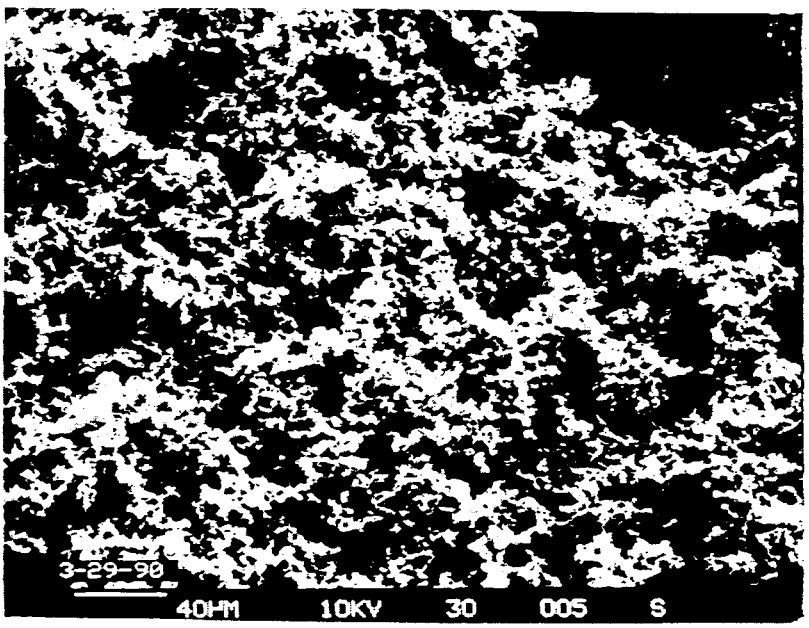
FIG._39B

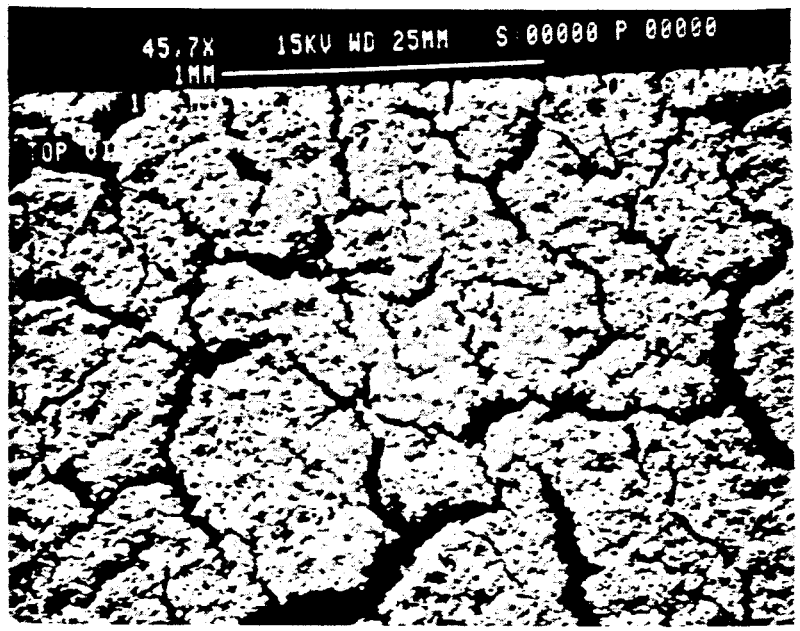
*FIG._40A*
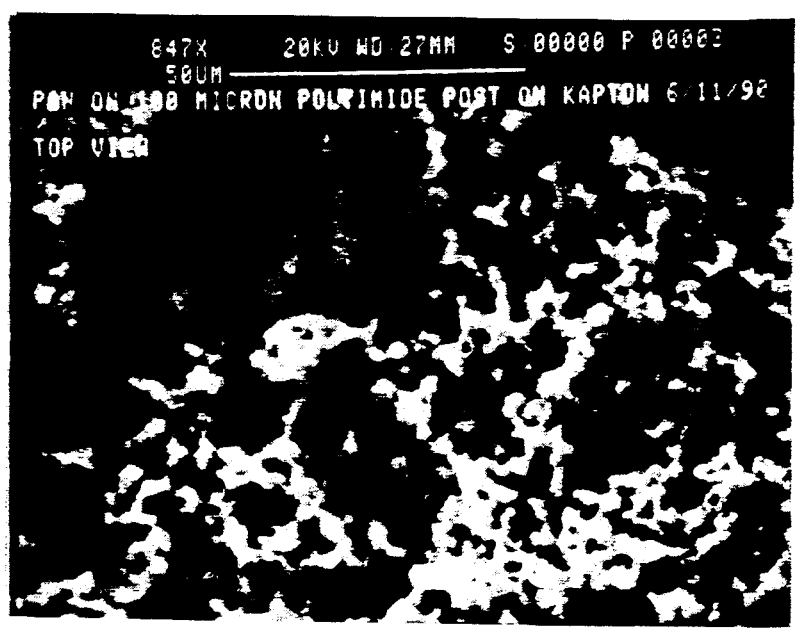
*FIG._40B*

THREE-DIMENSIONAL MICROSTRUCTURE AS A SUBSTRATE FOR A BATTERY ELECTRODE

ORIGIN OF THE INVENTION

The present invention is a continuation-in-part of U.S. patent application Ser. No. 334,680, filed Apr. 6, 1989, now U.S. Pat. No. 5,002,700 and is also a continuation-in-part of U.S. patent application Ser. No. 599,002, filed Oct. 17, 1990, now abandoned, and is also a continuation-in-part of U.S. patent application Ser. No. 675,091, filed Mar. 25, 1991, now U.S. Pat. No. 5,187,034, and a continuation-in-part of U.S. Ser. No. 828,414, filed Jan. 31, 1992, still pending. All of these pending patent applications are incorporated herein by reference in their entirety.

BACKGROUND OF THE INVENTION

1. Field of the Invention

The present invention concerns the production and use of a three dimensional electrode substrate covered with electrically conductive organic polymer having improved current carrying and storage capacity as compared to a substantially smooth surface electrode. The organized three-dimensional substrate is usually obtained by lithographic techniques. This combination is particularly useful as a battery electrode. The electrically conductive organic polymers are selected from poly(aniline), poly(pyrrole), poly(thiophene), and the like.

2. Description of the Related Art

Examination of the appropriate literature indicates that there has been little recognition of the advantages of using a three dimensional surface to hold and to discharge an electric current or to be electrochromic.

M. Kaya, et al. discuss polyaniline as the positive electrode for a storage battery in Denki Kagaku (Japan), Vol. 52, #2, pp. 847-848 (December 1984).

The present invention described herein provides such polymeric coating on a three-dimensional substrate, which includes improved adhesion to the substrate, larger surface area, and a much larger charge capacity.

The organized three-dimensional substrate is obtained using lithographic techniques. This combination is particularly useful as a battery electrode. Dopants for the electrically conducting polymer include organic sulfonic acids, tetrasulfonated metal phthalocyanines, etc.

SUMMARY OF THE INVENTION

The present invention relates to an article of commerce which is a combination of an electrically polymerized monomer on the surface of a manufactured three dimensional substrate. The three-dimensional article has greater electrical charge storage capacity for a capacitor or a battery electrode than the smooth electrode surface.

More specifically, the present invention relates to a three-dimensional electrode substrate structure for use as a conductive organic polymer battery electrode, having improved properties, such as improved current carrying capacity as compared to a substantially smooth surface. The structure of the article comprises a thin surface layer of an electrically conductive organic polymer, such as a poly(aniline) or poly(pyrrole) film, on a three-dimensional electrode substrate surface, and the polyaniline or poly(pyrrole) film has a thickness of between about 0.1 and 10 microns, preferably about 0.1 to 5 microns. The organized three-dimensional substrate is obtained by lithographic techniques, preferably by photolithographic techniques. The substrate surface is irregular or patterned having a protruding surface, wherein a representative protrusion has a surface of between about 5 and 400 micrometers$^2$, a relative height of between about 10 and 100 micrometers from the surface and the protrusions amount to between about 40 to 90 percent of the surface of the electrode substrate.

BRIEF DESCRIPTION OF THE FIGURES

FIG. 1 is a schematic representation of a three dimensional polymeric electrode structure showing polymer, metal (Pt) layer, polyimide ordered protrusions and $Si_3N_4$ coated silicon wafer or polyimide-covered ceramic.

FIG. 2A is a scanning electron micrograph (SEM) of the Type A array of a three-dimensional microelectrode at 20 microns.

FIG. 2B is the SEM of FIG. 2A at 4 microns.

FIG. 3A is a scanning electron micrograph of a Type B array of a three-dimensional microelectrode at 40 microns.

FIG. 3B is SEM of FIG. 3A at 100 microns.

FIG. 4A is a representation of a cyclic voltammagram of a polyaniline film in 1M $ZnSO_4$ at two different pH values (pH of 2.3 and 4.5) on a platinum-coated array of a three-dimensional microelectrode (Type A) at a scan rate of 50 mV/S.

FIG. 4B is a graphic representation of a cyclic voltammagram of a flat platinum-coated ceramic electrode at a scan rate of 50 mV/s.

FIG. 5A is a graph of the polyaniline film grown by the cyclic potential method (5.5 h) showing the charge/discharge curves at $\pm 1$ mA/cm$^2$ in 1M zinc sulfate (pH at 2.3) having zinc sheet as a anode.

FIG. 5B of FIG. 5A is an SEM of a polyaniline film grown on a platinum-coated array of Type A three-dimensional electrode at 100 microns.

FIG. 5C is the graph of comparable charge/discharge curves under the conditions of FIG. 5A of a polyaniline film on flat platinum-coated ceramic electrode.

FIG. 5D is a m SEM of the smooth polyaniline film comparably to FIG. 5B at 20 microns.

FIG. 6A in a graph of the polyaniline film grown without NAFION ® (a sulfonated polytetrafluoroethylene, a trademark of and available from W.E. Gore, Inc. of Elkton, Md.) film showing the charge/discharge curve at $\pm 1$ mA/cm$^2$ in 1M zinc sulfate (pH at 2.3) with zinc sheet as an anode.

FIG. 6B is an SEM of the surface morphology of a polyaniline film prepared with the Type B three-dimensional microstructure at 40 microns.

FIG. 6C is an SEM of FIG. 6B at 100 microns.

FIG. 7A is a graph of the polyaniline film grown with NAFION ® film showing the charge/discharge curve at $\pm 1$ mA/cm$^2$ in 1M zinc sulfate (pH at 2.3) with zinc sheet as an anode.

FIG. 7B is an SEM of the surface morphology of the polyaniline film prepared with the Type B three-dimensional microstructure at 40 microns.

FIG. 7C is an SEM of FIG. 7B at 100 microns.

FIG. 8 is a schematic representation of a Type B three-dimensional electrode showing an array of round polyimide posts covered with platinum.

FIG. 9 is a group of SEM for comparison of Type C and Type D three-dimensional microelectrodes.

FIG. 9A is an SEM of Type C showing polyimide square posts at 40 microns before growth of the polyaniline film.

FIG. 9B is an SEM of Type C showing the electrode after growth of polyaniline films by a potential cyclic method at 40 microns.

FIG. 9C is an SEM showing etched silicon posts at 40 microns before the growth of the polyaniline film.

FIG. 9D is an SEM showing the electrode at 40 microns after growth of the polyaniline film by a potential cyclic method.

FIG. 10A is a schematic representation of Type D three-dimensional electrode of platinum-covered arrays of etched silicon posts having a square based pyramid structure.

FIG. 10B is a schematic representation of the three-dimensional electrode of FIG. 10-A having a straight-based pyramid structure.

FIG. 11A is a graphic comparison of charge/discharge curves at ±1 mA/cm in 1M zinc sulfate (pH=2.3) having zinc sheet as an anode.

FIG. 11B shows the graph for the Type C polyimide square post electrode.

FIG. 11C shown the graph for Type D etched silicon posts.

FIG. 12A is an SEM of Type E three-dimensional microelectrode before deposition of polyaniline at 10 microns.

FIG. 12B is an SEM at 10 microns of the Type E three-dimensional microelectrode of FIG. 12A after deposition of polyaniline.

FIG. 13 show SEMs before and after deposition of polyaniline on Type F three-dimensional microelectrode.

FIG. 13A is an SEM before deposition of polyaniline at 100 microns.

FIG. 13B is an SEM before deposition of polyaniline at 40 microns.

FIG. 13C is an SEM after deposition of polyaniline at 100 microns.

FIG. 13D is an SEM after deposition of polyaniline at 40 microns.

FIG. 14A is a graphic representation of charge/discharge curves of Type E three-dimensional polyaniline electrodes at three different current densities in 1M zinc sulfate (pH at 2.3) with zinc sheet as an anode.

FIG. 14B is a graphic representation charge/discharge curves of Type F electrodes as described in FIG. 14A.

FIG. 15 is a schematic representation of a prototype battery housing (sample chamber) and clamp.

FIG. 16 shows two SEM of fat post three-dimensional microelectrodes. FIG. 16A is at 100 microns and FIG. 16B is at about 10 microns.

FIG. 17 shows for comparison a group of SEM of polyaniline/tosylate (PAN/TS-PAN3069) and polyaniline/trifluoromethanesulfonic acid (PAN/TF-MSA—PAN 3070) grown on a porous ceramic substrate.

FIG. 17A is PAN/TS at 40 microns.

FIG. 17B is PAN/TS at 4 microns.

FIG. 17C is PAN/TFMSA at 40 microns.

FIG. 17D is PAN/TFMSA at 4 microns.

FIG. 18 is a schematic representation of a modified three-dimensional structure showing self-doped polyaniline, noble metal, e.g., gold, negative resist and substrate.

FIG. 19 shows for comparison two SEMs.

FIG. 19A shows an SEM of a Type 1a array, 747 negative resist pattern at 4 microns.

FIG. 19B shows a m SEM of a Type 1b array with a 747 negative resist pattern at 4 microns.

FIG. 20 shows SEMs in which FIG. 20A is an SEM of a Type IC gold evaporated three-dimensional electrode substrate.

FIG. 20B shows a SEM of the film of polyaniline/trifluoromethanesulfonic acid grown on the substrate of FIG. 20A at 400 microns.

FIG. 20C is an SEM of FIG. 20B at 100 microns.

FIG. 21 is a graphic representation of the total charge discharge curve of two self-doped polyanilines polyaniline/p-toluenesulfonic acid (PAN/TS) and polyaniline/trifluoromethanesulfonic acid (PAN/TF-MSA) in 1M zinc sulfate (pH at 2.3) with a zinc sheet as anode using 1.5V, 25 mA incandescent bulb as a load factor.

FIG. 22A is a graphic representation for various PAN/TFMSA battery electrodes showing coulomb efficiency for voltage range of 1.75 and 1.35 volts as a function of current density in 1M zinc sulfate.

FIG. 22B is a graphic representation of the films of FIG. 22A for charge/discharge current density at the same conditions.

FIG. 23 is a graphic representation of the discharge curves of polyaniline/trifluoromethanesulfonic acid (PAN/TFMSA-PAN 3101) in 1M zinc sulfate (pH at 2.3) with zinc sheet as an anode and a 1.5V, 25 mA incandescent bulb as a load after charging at +1.8 volts for 2 min. (curve a), 10 min (curve b) and 60 min (curve c).

FIG. 24 is a graphic representation of the discharge curves of polyaniline/trifluoromethanesulfonic acid (PAN/TFMSA-PAN 3103) in 1M zinc sulfate (pH at 2.3) with zinc sheet as anode, and a 1.5 volt, 25 mA incandescent bulb as a load after charging at +10 mA/cm$^2$ for 2 min (curve a), for 10 min (curve b) and 30 min (curve c).

FIG. 25 is a graphic representation of the superior long-term charge/discharge curves of polyaniline/trifluoromethanesulfonic acid (PAN/TFMSA-PAN 3098) zinc battery at ±20 mA/cm$^2$ in 1M zinc sulfate at pH of 2.3.

FIG. 26A is a scanning election micrograph of three-dimensional polyimide posts fabricated using a 100 micron mesh metal shadow mask at 200 μm.

FIG. 26B is an SEM of FIG. 26A at 50 μm.

FIG. 27A is an SEM at 100 μm of polyimide posts fabricated with a 100 micron wire mesh mask with a 30 sec exposure and a two-minute immersion development.

FIG. 27B is an SEM of FIG. 27A at 50 μm.

FIG. 28A is an SEM micrograph at 12 microns of polyimide posts fabricated using a 25 sec UV exposure, 2.5 min developing and one min rinse.

FIG. 28B is an SEM at 12.6 microns of polyimide posts fabricated using a 30 sec UV exposure, 2.5 min developing and a one min rinse.

FIG. 29A is an SEM at 10 microns of polyimide posts fabricated using a 15 sec UV exposure, 2.5 min developing and one min rinse.

FIG. 29B is an SEM at 10.5 microns of polyimide posts fabricated using a 20 sec UV exposure, 2.5 min developing and one min rinse.

FIG. 30A is an SEM at 20 microns of platinum-coated polyimide posts made with a 20 micron mask.

FIG. 30B is an SEM at 5 microns of a platinum-coated polyimide posts made with a 20 micron mask.

FIG. 31 is an SEM showing a close-up view of the surface profile of a three-dimensional polyimide post at 5 micron.

FIG. 32 is a representative cyclic voltammonogram of polyaniline/trifluoromethanesulfonic acid synthesized on platinum sputtered KAPTON ® (a polymer comprising polyimide. It is a trademark of and is commercially available from the DuPont Co., located in Wilmington, Del.) during polymerization in 0.1M aniline and 0.1M trifluoromethanesulfonic acid.

FIG. 33A is an SEM at 200 microns showing typical surface morphology of self-doped polyaniline/trifluoromethanesulfonic acid fabricated on platinum-sputtered KAPTON ®.

FIG. 33B is an SEM of FIG. 33A at 40 microns.

FIG. 34 is a representative cyclic voltammogram of polyaniline/toluenesulfonic acid synthesized on platinum-sputtered KAPTON ® during polymerization in 0.1M aniline at 0.1M toluenesulfonic acid.

FIG. 35A is an SEM at 200 microns showing typical surface morphology of self-doped polyaniline toluenesulfonic acid film fabricated or platinum-sputtered KAPTON ®.

FIG. 35B is an SEM of FIG. 35A at 40 microns.

FIG. 36 are representative cyclic voltammograms of polyaniline/toluenesulfonic acid.

FIG. 37A is an SEM at 40 microns showing typical surface morphology of self-doped polyaniline/toluenesulfonic acid film fabricated using a potential cycling method.

FIG. 37B is an SEM at 40 microns of FIG. 37A with a film created using a constant current method.

FIG. 38 is an SEM at 200 microns of a three-dimensional sputtered platinum fat-post electrode fabricated on a KAPTON ® substrate.

FIG. 39A is an SEM at 200 microns showing the surface morphology of polymerized PAN on a three-dimensional sputtered platinum fat-post electrode fabricated on a KAPTON ® surface.

FIG. 39B is an SEM of the film of FIG. 39A at 40 microns.

FIG. 40A is an SEM at 1 mm of a top view of a PAN film on 100 micron polyimide posts on KAPTON ® substrate.

FIG. 40B is an SEM of the film of FIG. 40A at 100 microns.

DETAILED DESCRIPTION OF THE INVENTION AND PREFERRED EMBODIMENTS

Three-Dimensional Microstructure as a Substrate for the Polyaniline Battery Electrode FIG. 1 schematically shows one of the possible structures. The roughness factor of such a structure can be calculated based on the height of the post, and the spacing (distance between two posts from center to center). For example, a factor of 25 was derived by assuming that the height of polyimide posts is approximately 100 $\mu$m and the spacing and diameter are about 10 $\mu$m.

Several three-dimensional electrodes were fabricated to obtain some preliminary results regarding the behavior of arrays of three-dimensional electrodes. However, the height of the polyimide posts and the distance between them were limited by the available masks. FIGS. 2A, 2B, 3A, and 3B show scanning electron micrographs (SEM) of Type A and Type B platinum-coated polyimide three-dimensional structures:

Type A: electrode, arrays of square posts approximately 8 $\mu$m high and spacing fabricated on a ceramic (Kyocera A493); a piece of nickel-silver screen was used as the mask.

Type B: arrays of posts approximately 55 $\mu$m tall and 250 $\mu$m apart fabricated on a polyimide-covered ceramic.

Effect of Substrate Electrode Structures on Electrochemical Polymerization of Aniline A cyclic potential method was used to prepare two different polyaniline films on a conventional planar platinum electrode and on a three-dimensional array structure platinum electrode (Type A structure, FIG. 2A and 2B) to obtain preliminary data regarding usefulness of such three-dimensional structure electrodes. The potential was cycled between $-0.2$ and $+0.8$ V vs. SCE at a scan rate of 0.1 V/s in a solution of 0.1M $H_2SO_4$ containing 0.1M aniline for 1000 cycles (a total of 5.5 hours). In the cyclic potential method, the thickness of the conductive films can be controlled by the number of cycles.

FIG. 4A shows the cyclic voltammograms (CV curves) in 1M $ZnSO_4$ solution at pH 4.5 and 2.3 of the grown polyaniline films on the three-dimensional structure and the planar structure. A substantial increase in both current density and charge capacity (notice that the current scale is ten times higher for the three-dimensional electrode (FIG. 4A)) was observed when polyaniline film was prepared on the three-dimensional structure. In addition, the effect of solution pH on the CV curves appears to be less pronounced for the polyaniline made on the three-dimensional structure (FIG. 4B). This result suggests that H. ions are more efficiently transported or utilized.

FIGS. 5A and 5B provide a comparison of the surface morphology of the films; the morphology is strikingly different on the two electrodes. While the polyaniline film made on the conventional, flat platinum-coated ceramic electrode exhibits a compact, smooth, carpet-like morphology, the polyaniline film prepared on the Type A three-dimensional electrode exhibits a microporous structure with a large specific surface area. The corresponding typical charge/discharge curves on the two electrodes are also presented in FIGS. 5A, 5B, 5C and 5D. A zinc sheet was used as anode in the battery system with 1M $ZnSO_4$ (pH 2.3) as the aqueous electrolyte. The open-circuit cell voltage was approximately $+1.5$ V. The three-dimensional PAN/zinc battery (FIG. 5A) was charged and discharged at constant current of $\pm 1$ mA/cm$^2$ with a cycle time of 2 minutes and remained stable after more than 12 repeated cycles. On the other hand, the planar PAM/zinc system of (FIG. 5B) exhibited irreversible behavior; the cell voltage rose quickly to exceed $=2$ V (which may be beyond the PAN stability window) during charging and dropped instantaneously during discharging, the film finally separated from the electrode after repeated cycling.

The above results clearly demonstrate the utility of the novel three-dimensional structure as an electrode for electrochemical polymerization. The electrochemical kinetics (i.e., charge/discharge behavior) of polyaniline prepared on the three-dimensional electrode was greatly improved. However, the observed improvement of the PAN electrode performance on this particular Type A structure appears to be solely attributable to an increase in the surface area of the electrode/substrate, resulting from the three-dimensional structure, which in turn provides a suitable current density for the polymerization that yields a polymer structure with a high-surface-area-to-volume ratio. Therefore, using the present invention it is possible to improve substantially the performance of PAN electrodes if a real three-dimensional feature of the conductive polymer is established.

Effect of Substrate Microstructure (Flat v. Three-Dimensional)

For those polyaniline films prepared in the presence of $SO_4^{-2}$ ions, the performances of the polyaniline electrodes made on the three-dimensional structures are much superior to those prepared on the flat ceramic electrode. For example, the battery comprising a polyaniline electrode made on the Type A structure (Electrode 28) is charged with up to 5 mA/cm$^2$, with 100% coulomb efficiency. However, as the current density increased from to 5 mA/cm$^2$, the charge/discharge rate also increases from $\pm 2$ to $\pm 7$ mV/s.

For the current density range studied (1 to 2 mA/cm$^2$), the polyaniline electrodes prepared on a Type B structure (Electrodes 29 and 41) exhibited a comparable performance to those made on Type A structures. FIG. 6A, 6B, 6C, 7A, 7B and 7C show the surface morphology of the films and corresponding charge/discharge curves. When the three-dimensional structure was coated with NAFION ® film before electropolymerization, the resulting surface exhibited a more compact, smooth morphology (Electrode 41). Also, the polyaniline films prepared in the NAFION ® should be mechanically more stable and thus more attractive from the practical point of view.

Alternative Three-Dimensional Structures as Electrode Substrate

Several methods of fabricating the three-dimensional microelectrode arrays for the battery application were evaluated. The electrochemical kinetics of polyaniline prepared on the three-dimensional electrodes (Type A and Type B shown in FIG. 8) improved greatly.

To improve further the charge/discharge capacity of the polyaniline electrode, the arrays were fabricated with a high ratio of the height of a platinum-covered polyimide pole to the distance between adjacent poles. The first step in the fabrication is deposition of a polyimide layer on a substrate. In general, the adhesion of polyimide onto KYOCERA ® A493C, (a ceramic comprising alumin. It is a trademark of and commercially available from KYOCERA, Inc. of Kyoto, Japan) ceramic substrate is better than that onto Si$_3$N$_4$. It was found, however, that the adhesion of a polyimide layer to the ceramic substrate is very sensitive to the relative humidity during the fabrication, and the relative humidity should be kept below 40% to yield a good adhesion. After the polyimide layer has been deposited onto the substrate, the success of the rest of fabrication depends on the geometry of the desire arrays, especially the height of the post. For example, when h=100 $\mu$m with l=50 $\mu$m and w=50 $\mu$m, the posts collapsed, and the polyimide layer curled up and separated from the substrate. Therefore, the height of the posts was reduced to approximately 50 $\mu$m (Type C). FIG. 9A shows a scanning electron micrograph of Type C platinum-coated polyimide three-dimensional structure. Arrays of square posts approximately 40 $\mu$m tall and 55 $\mu$m apart were fabricated on the Kyocera A493 ceramic substrate.

To eliminate the adhesion problem of polyimide layer to the substrate, a three-dimensional structure was fabricated by anisotropic etching of a silicon wafer illustrated in FIG. 10A (Type D). FIG. 9B shows a scanning electron micrograph of an actually fabricated electrode with Type D design. A <100> oriented silicon wafer was used to form arrays of a square-based pyramid structure. The arrays of etched silicon posts are approximately 20 $\mu$m tall and 70 $\mu$m apart. A residual layer of chromium (possibly with Si$_3$N$_4$) is seen on the top of each pyramid. Alternatively, using a <100> oriented silicon wafer, we can generate arrays of an essentially straight-walled square with walls of <111> orientation.

Polyaniline films were prepared by a cyclic potential method onto the Type C and Type D three-dimensional platinum microelectrode arrays, and their charge/discharge behavior was evaluated. The potential was cycled between $-0.2$ and $+0.8$ V vs. SCE at a scan rate of 0.1 V/s in a solution of 0.1M H$_2$SO$_4$ containing 0.1M aniline for 1000 cycles (5.5 hours). FIG. 21 compares charge/discharge curves of Type C and D polyaniline electrodes and the curve obtained on an earlier prepared Type A polyaniline electrode. A zinc sheet was used as anode in the battery experiment with 1M ZnSO$_4$ (pH 2.3) as the aqueous electrolyte. The batteries were charged and discharged at a constant current of $\pm 1$ mA/cm$^2$.

Unfortunately, both Type C and Type D polyaniline electrodes exhibited an irreversible behavior and only lasted for about 20 cycles, while Type A polyaniline electrode was more reversible and remained stable after repeated cycling. FIGS. 9C and 9D show surface morphology of the polyaniline films prepared on Type C and Type D three-dimensional microelectrodes. The scanning electron micrograph (SEM) pictures reveal that most of the polymerization of aniline took place preferentially on the tope of posts, whereas very little occurred on the bottom surface.

Modified Type A Three-Dimensional Structures: Types E and F

The above results suggest that the three-dimensional polyaniline electrode structure with a round, curved surface would be more desirable as an electrode substrate for battery applications than those with a squared-wall structure.

Two types of such an improved modified Design A structure having a more smooth profile surface were fabricated:

Type E: a structure consisting of arrays of 10 $\mu$m convex surface (FIG. 12A) fabricated using a 2000-mesh nickel screen as the mask.

Type F: a structure consisting of arrays of round posts approximately 20 $\mu$m high, 100 $\mu$m diameter (FIGS. 13A and 13B fabricated using a piece of stainless-steel mask with 100 $\mu$m holes as the mask.

A polyaniline film was prepared by the standard potential cycling method on these structures, and battery performance was evaluated. FIGS. 14A and 14B shows the charge/discharge curves of the PAN/Zinc batteries as a function of charge/discharge current density ranging from $\pm 2$ to $\pm 10$ mA/cm$^2$. Both Type E and Type F electrodes exhibit a great improvement in the electrochemical reversibility over the previous designs. This is the first time that the polyaniline battery electrode has been shown to be capable of charging/discharging at as high as $\pm 10$ mA/cm$^2$ for a long period of time. Moreover, the polymer electrodes show little sign of degradation after repeated cycling (the test was continued up to 100 cycles). FIGS. 12B, 13C and 13D show the surface morphology of the polyaniline films grown on Type E and Type F three-dimensional structures. The polyaniline films are grown uniformly on the entire surface of these substrates and exhibit a microporous structure with a large surface area.

General Fabrication Procedure (Photolithography)

Generally, the three-dimensional posts (electrode structure) as fabricated are between about 5 and 200 microns tall, and between about 100 and 50,000 square microns in area (either square, round or irregular in shape). The spacing between the post edges is between about 10 and 50 microns. Preferably, the posts are between about 10 and 50 microns in height, between about 10,000 and 30,000 square microns in surface area and spaced between about 50 and 100 microns apart (from the peripheral edges of the posts). These posts are fabricated on the surface of the substrate using for example conventional lithogrpahy techniquees known in the art. Photolithography is preferred as is described herein.

The key steps for the fabrication of the platinum-coated polyimide post structures in Type E and Type F are as follows:

Step 1: Clean the substrate (e.g. Kyocera A493 ceramic tile) in sulfuric acid-peroxide mixture and bake the substrates at a temperature above 150° C. (up to 300° C.) for at least 1 hour for dehydration.

Step 2: Apply a layer of adhesion promoter and baked the substrate for about 10 minutes (especially necessary when a silicon wafer is used as the substrate). Apply polyimide to the center of substrate and spin; the thickness is 0.5 to 100 microns of the polyimide layer is determined by the spin speed.

Step 3: Place the substrate on a preheated hot plate with temperature at 85° C. for 30 minutes and then placed into a bake oven for another 30 minutes at 90° C.

Step 4: Expose the substrate with a UV flood exposure system for a predetermined time, followed by baking for at least 30 minutes up to 1 hour to develop. Spray-develop and spray-rinse the substrate to remove the unreacted polyimide, and blow it dry to form the desired three-dimensional microstructure.

Step 5: Cure the polyimide fully in a vacuum bake oven by pumping down and programming the temperature control.

Step 6: Deposit the platinum using the procedure adapted from the procedure described in U.S. Ser. No.

A. Design of a Laboratory Prototype of a Zinc-Polyaniline Battery

A laboratory prototype of the aqueous polymer battery was designed comprising a zinc sheet anode, a self-doped polyaniline electrode (PAN/TS/or TS) or PAN/TFMSA and a supporting battery electrolyte, 1M ZnSO$_4$, pH 2.3). A total of 20 samples of the laboratory prototypes were constructed and tested in an attempt to identify the best components of the battery.

FIG. 21 shows the design of the housing and the clamp for the laboratory prototype. The housing is basically a closed box, approximately $2 \times 2 \times 1.5$ inches, made of FLEXIGLAS ® (a polymethylmethacrylate polymer, a trademark of and available from the Rohm and Haas Corporation, Philadelphia, Pa.) (FIG. 15A), The two battery electrodes, both $1 \times 1$ inch, were assembled using the clamp (FIG. 15B). The epoxy resin used to insulate the wires acts as a spacer. A 1-cm square piece of zinc sheet was fixed onto a 1-inch square ceramic tile (KYOCERA ® A493) and used as an anode throughout the experiments. No attempt was made to us a zinc anode consisting of zinc microparticles dispersed in a NAFION ® film.

B. Three-Dimensional Electrode Substrate for Self-Doped Polyanilines and Electrochemical Polymerization A three-dimensional microstructure as an electrode substrate (i.e., a platinum covered 3D polyimide structure) throughout the evaluation of the battery to maximize the charge capacity of the self-doped polyaniline electrode.

Most of the self-doped polyaniline cathodes (i.e., 1 cm$^2$ electroactive area) used in the prototype batteries were fabricated on the modified design Type-1c three-dimensional substrate made of negative resist (Type-1c array=15-$\mu$m squares, that are 4-$\mu$m high.

The dopant TS or TFMSA in the polymer optionally is present in the initial electropolymerizaton solution in a ratio of TS or TFMSA/monomer in about a 10/1 to 1/10 molar ratio. In one embodiment a to molar ratio is preferred. Also, one can adapt the electropolymers produced in U.S. Ser. No. 848,414.

1. Fat-Post Electrodes - FIG. 16 shows scanning electron micrographs (SEM) of our standard three-dimensional electrode, fat-posts. The arrays are made of platinum-covered polyimide consisting of arrays with round posts approximately 20 $\mu$m high and 100 $\mu$m in diameter. Table compares coulomb efficiency and capacity, as a function of charge-discharge current density, of the two promising self-doped-polyaniline electrodes grown on the fat-post current density, of the two promising self-doped-polyaniline electrodes grown on the fat-post electrode. The coulomb efficiency increases with an increase of current density, reaching 100% at $\pm 20$ mA/cm$^2$ for both electrodes. At present, PAN/Ts appears to be superior regarding charge capacity; however, the charge capacity decreases with an increase of current density on both electrodes. Our efforts have concentrated on improving the design of the substrate to enhance the charge capacity at high operating current densities.

TABLE 1

COULOMB EFFICIENCY AND CHARGE CAPACITY OF TWO SELF-DOPED POLYANILINE-BASED BATTERIES

| Electrode | Description | Current Density (mA/cm$^2$) | | | |
|---|---|---|---|---|---|
| | | $\pm 5$ | $\pm 10$ | $\pm 15$ | $\pm 20$ |
| PAN 3079b | | | | | |
| Coulomb efficiency (%) | Fat post/ | 93 | 93 | — | 100 |
| Capacity (Ah/kg) | TFMSA* | 6.2 | 3.0 | — | 1.3 |
| PAN 3081 | | | | | |
| Coulomb efficiency (%) | Fat post/ | 80 | 96 | 97 | 100 |

TABLE 1-continued
COULOMB EFFICIENCY AND CHARGE CAPACITY OF TWO SELF-DOPED POLYANILINE-BASED BATTERIES

| Electrode | Description | Current Density (mA/cm$^2$) | | | |
|---|---|---|---|---|---|
| | | ±5 | ±10 | ±15 | ±20 |
| Capacity (Ah/kg) | Ts | | 10.5 | 7.6 | 4.7 | 3.2 |

Charge-discharge experiments were conducted using a zinc sheet as an anode in 1 M ZnSO$_4$ (pH 2.3)
*TFMSA: polyaniline/trifluoroethanesulfonic acid
Ts: polyaniline/tosylate.

2. Modified Fat-Post Electrodes Fabrication

Modified fat-post electrodes (Type-1a array, 3-μm squares, 1-μm high; and Type-1b array, 4-μm squares, 2-μm high) were made. Because of the deleterious health effects associated with prolonged exposure to polyimides, an ultraviolet resist process with a negative photoresist was used. FIG. 18 shows the new three-dimensional (Type 1) structure, that is produced as follows:

Step 1: Coat 1 inch×1 inch ceramic substrates (KYOCERA ® Type A493) with KTI 747 negative resist and soft bake for 30 minutes in air at 80° C.

Step 2: Pattern the resist by ultraviolet exposure through a piece of 1000-mesh nickel screen mask; develop in KTI, a commercially available photoresist material 802 negative-resist developer (100% concentrated), followed by a chlorobenzene rinse. The resulting pattern consists 3-μm squares that are 1-μm high (Type-1a array) or 4-μm squares that are 2-μm high (Type-1b array) with 4-μm center-to-center spacing.

Step 3: Hard bake the resist at 100° C. in air for 30 minutes.

TABLE 2
CHARGE-DISCHARGE PERFORMANCE (HALF CELL)* OF THE SELF-DOPED POLYANILINE ELECTRODES MADE ON POROUS CERAMICS

| Electrode | Substrate/ Polyaniline | Current Density (mA/cm$^2$) | | | |
|---|---|---|---|---|---|
| | | ±2 | ±5 | ±7.5 | ±10 |
| PAN 3069 | | | | | |
| Coulomb efficiency (%) | FA10/Ts | 62% | 83% | 92% | — |
| Capacity (Ah/kg) | | 1.71 | 1.43 | 1.24 | — |
| PAN 3070 | | | | | |
| Coulomb efficiency (%) | FA10/ | — | 61% | 75% | — |
| Capacity (Ah/kg) | TFMSA | — | 0.98 | 0.79 | — |
| PAN 3071 | | | | | |
| Coulomb efficiency (%) | FA10/Ts | 42% | 72% | 80% | — |
| Capacity (Ah/kg) | | 0.84 | 0.72 | 0.54 | — |
| PAN 3072 | | | | | |
| Coulomb efficiency (%) | FA12/ | 85% | 93% | 97% | — |
| Capacity (Ah/kg) | TFMSA | 0.98 | 0.80 | 0.65 | — |
| PAN 3079a | | | | | |
| Coulomb efficiency (%) | FA12/Ts | — | 74% | 87% | 92% |
| Capacity (Ah/kg) | | — | 1.17 | 0.98 | 0.75 |
| PAN 3079b | | | | | |
| Coulomb efficiency (%) | Fat post/ | — | 67% | — | 86% |
| Capacity (Ah/kg) | TFMSA | — | 9.8 | — | 6.2 |
| PAN 3081 | | | | | |
| Coulomb efficiency (%) | Fat post/ | 56% | 75% | — | 100% |
| Capacity (Ah/kg) | Ts | 14.5 | 10.2 | — | 5.2 |

*In 1 M ZnSO$_4$ solution (pH 2.3)

Step 4: Deposit a 4000-Å-thick gold layer on the resist using an evaporation process.

The electrode substrate is ready for electrochemical polymerization (polyaniline or polypyrrole).

FIG. 19A and 19B show SEM photos of the finished structures.

Table 2 lists the self-doped-polyaniline electrodes synthesized and examined as laboratory prototype batteries. The entire surface of the three-dimensional photoresist layer was covered with a gold layer prepared by an ohmic evaporation technique. Before electrochemical polymerization, usually only the electroactive area of 1 cm$^2$ (masked by several layers of 3M Type 470 tape) was exposed to the solution. A sputtering technique was used to deposit a platinum layer because of the instability of the photoresist above approximately 150° C. When gold was used as the metal layer, PAN/Ts films did not grow well. PAN/TFMSA films grow very rapidly because of an unexplained "electrocatalytic" effect of gold. Therefore, most of the self-doped polyaniline electrodes were synthesized using trifluoromethanesulfonic acid.

FIGS. 20A and 20B show SEM photos of the original Type-1c three-dimensional electrode and a grown film of PAN/TFMSA (PAN 3098). The PAN/TFMSA film grown on the Type-1c three-dimensional electrode exhibits a uniform microporous structure with a large specific area, ideal for battery applications. When the same film was grown on a conventional, flat substrate, the film showed extensive macrocracks. It appears that the Type-1C three-dimensional substrate provides a current density in the "right" range that yields a polymer structure with a high-surface-area-to-volume ratio.

C. Evaluation of Laboratory-Prototype Batteries: Charge-Discharge Testing.

Various types of charge-discharge testing (constant-voltage charging and constant-current charging at different charging times) were undertaken to evaluate various laboratory prototype batteries. In the case of constant-voltage charging, +1.8 V was applied using a potentiostat between the polyaniline positive electrode (connected to the working electrode terminal) and the zinc-sheet negative electrode (connected to the counter electrode terminal and reference electrode terminal).

The initial screening battery test was conducted as follows:

Each battery was charged at =1.8 V for 2 min, followed by an open-circuit condition for 1 minute, then discharged at a high current density using a miniature incandescent lamp (1.5 V, 25 mA) until the battery was discharged completely. The entire sequence was repeated, if necessary, after a 1-minute open-circuit condition. Table 13 summarizes the results. When the platinum-coated porous ceramics were used, KYOCERA ® Fa10 and KYOCERA ® FA1R (commercially available grades of alumina) substrates, (PAN 3079a, 3084, 3085, and 3086 in Table 2), and when polymers were grown on the entire surface of the Type-1c electrode (PAN 3096 and PAN 3097 in Tables 3 and 4), the batteries did not hold any charge and exhibited an almost instantaneous discharge. A common feature among these polyaniline electrodes is that, although the electropolymerization was continued for a prolonged period of time (e.g., 1 to 2 days), the polymer films did not appear to grow well (less than 40 C were accumulated).

TABLE 3

ELECTROCHEMICAL SYNTHESIS CONDITIONS OF SELF-DOPED POLYANI-
LINES USED IN LABORATORY PROTOTYPE BATTERIES

| Electrode | Substrate | Preparation Method Starting Monomers* | Potential Range (V vs SCE) | Scan Rate (V/s) | Time (h) | Total Coulomb (O/cm$^2$) | Δ Weight (g) |
|---|---|---|---|---|---|---|---|
| PAN 3079a | FA12 | 1 M Ts | −0.2 ⇌ 0.8 | 0.1 | 27.5 | 16.0 | 0.2548 |
| PAN 3084 | FA12 | 1 M TFMSA | −0.1 ⇌ 0.9 | 0.1 | 36 | 39.9 | 0.2902 |
| PAN 3085 | FA10 | 1 M TFMSA | −0.1 ⇌ 0.9 | 0.1 | 78 | 36.5 | 0.1858 |
| PAN 3086 | FA12 | 1 M Ts | −0.2 ⇌ 0.8 | 0.1 | 29.5 | 35.0 | 0.1103 |
| PAN 3090 | Type 1c | 1 M Ts | −0.2 ⇌ 0.8 | 0.1 | 41.5 | 26.3 | 0.0153 |
| PAN 3091 | Type 1c | 1 M Ts | −0.1 ⇌ 0.9 | 0.1 | 18 | 252 | 0.2020 |
| PAN 3092 | Type 1c | 1 M Ts | −0.1 ⇌ 0.9 | 0.1 | 30 | 75.5 | 0.1016 |
| PAN 3093 | Type 1c | 1 M Ts | −0.2 ⇌ 0.8 | 0.1 | 40 | 40.9 | 0.0839 |
| PAN 3094 | Type 1c | 1 M Ts | −0.1 ⇌ 0.9 | 0.1 | 17.5 | 81.2 | 0.0855 |
| PAN 3095 | Type 1c | 1 M Ts | −0.2 ⇌ 0.8 | 0.1 | 45.8 | 99.2 | 0.1245 |
| PAN 3096 | Type 1c | 1 M TFMSA | −0.1 ⇌ 0.9 | 0.1 | 20 | 21.1 | — |
| PAN 3097 | Type 1c | 1 M TFMSA | −0.2 ⇌ 0.8 | 0.1 | 24 | 44 | — |
| PAN 3098 | Type 1c | 1 M TFMSA | −0.1 ⇌ 0.9 | 0.1 | 47 | 133.7 | — |
| PAN 3099 | Type 1c | 1 M TFMSA | −0.1 ⇌ 0.9 | 0.1 | 15 | 262.4 | 0.1069 |
| PAN 3100 | Type 1c | 1 M TFMSA | −0.1 ⇌ 0.9 | 0.1 | 41.5 | 94.9 | 0.0528 |
| PAN 3101 | Type 1c | 1 M TFMSA | −0.1 ⇌ 0.9 | 0.1 | 40 | 205 | 0.1009 |
| PAN 3102 | Type 1c | 1 M TFMSA | −0.1 ⇌ 0.9 | 0.1 | 22.5 | 125 | — |
| PAN 3103 | Type 1c | 1 M TFMSA | −0.1 ⇌ 0.9 | 0.1 | 41 | 142.6 | ≈0.07 |
| PAN 3104 | Type 1c | 1 M TFMSA | −0.1 ⇌ 0.9 | 0.1 | 40 | 92 | — |
| PAN 3105 | Type 1c | 1 M TFMSA | −0.1 ⇌ 0.9 | 0.1 | 22.5 | 135 | — |

*All include 0.1 M aniline; Ts = Tosylate (toluenesulfonic acid); TFMSA = trifluoromethanesulfonic acid
Polymer grown on entire surface
Electrode used for prototype batteries: (1) PAN 3102/zinc sheet; (2) PAN 3103/zinc sheet; (3) PAN 3104/zinc sheet; (4) PAN 3105/zinc sheet.

TABLE 4

SUMMARY OF ACCELERATED BATTERY PERFORMANCE TESTS*

| Electrode | Starting Monomer | Total Coulombs (C/cm$^2$) | Discharge Time (minutes) |
|---|---|---|---|
| PAN 3085 | FA10; 0.1 M An/ 1 M TFMSA | 36.5 | 0 |
| PAN 3096 | 0.1 M An/ 1 M TFMSA | 105.4 | 0 |
| PAN 3097 | 0.1 M An/ 1 M Ts | 22.2 | 0 |
| PAN 3093 | 0.1 M An/ 1 M Ts | 40.9 | 4.5, 3.5, 3.5 |
| PAN 3095 | 0.1 M An/ 1 M Ts | 99.2 | 4.5, 3.5, 3.5 |
| PAN 3097 | 0.1 M An/ 1 M Ts | 22.2 | 4.5, 3.5, 3.5 |
| PAN 3094 | 0.1 M An/ 1 M TFMSA | 81.2 | 9.3, 7.3 |
| | Nafion 117 as separator | | 9.0, 4.5 |
| PAN 3092 | 0.1 M An/ 1 M TFMSA | 75.5 | 8.6, 7.2 |
| PAN 3094 | 0.1 M An/ 1 M TFMSA | 81.2 | 9.3, 7.3 |
| PAN 3091 | 0.1 M An/ 1 M TFMSA | 252 | 9.5, 7.3 |

*Charged at +1.8 V for 2 minutes; discharged with 1.5-V, 0.25-mA incandescent lamp in 1 M ZnSO$_4$ (pH 2.3)
An = analine; Ts = tosylate (toluenesulfonic acid); TFMSA = trifluoromethanesulfonic acid
Entire surface FIG. 21 shows charge-discharge curves of two prototype batteries comprising different self-doped polyanilines: PAN/TFMSA (PAN 3094: 81.2 C) and PAN/Ts (PAN 3095: 99.2C). The PAN/TFMSA-based battery, although synthesized using a smaller amount of coulombs (81 C), lasted about twice as long (9.3 minutes) as the PAN/Ts-based battery (4.5 minutes). The results would demonstrate a superior battery electrode performance of PAN/TFMSA when the gold-coated Type-1c three-dimensional substrate is used.

FIGS. 22A and 22B compare coulomb efficiency and charge capacity of three prototype batteries comprising a PAN/TFMSA cathode and a zinc-sheet anode as a function of charge-discharge current density in 1M ZnSO$_4$ with or without a NAFION® film as a solid polymer electrolyte. Three PAN/TFMSAs were prepared using varying amounts of coulombs, i.e., PAN 3100: 95 C/cm$^2$, and PAN 3099; 262 C/cm$^2$. The capacity and coulomb efficiency were estimated based on the time for a battery to reach either of the cutoff voltages of a narrow window Ii.e., 1.35 V to 1.75 V) after each charge-discharge process. Although this method provides the basis for a fair comparison of battery electrodes, the obtained charge capacity values are low because the batteries are only marginally charged. The best charge-discharge characteristics were observed with PAN 3100 of an approximately 2-mm-thick PAN/TFMSA film (made with a total coulomb of 95 C/cm$^2$). Further increase of the total coulomb during the electrochemical polymerization process, which produces a much thicker film, resulted in no increase or decrease of coulomb efficiency and capacity. When a NAFION® film was cast onto the PAN/TFMSA film and used as a solid polymer electrolyte in conjunction with 1M ZnSO$_4$, a substantial decrease of charge capacity was observed (PAN 3101). A decrease of charge capacity was also observed when a 117 NAFION® membrane was used as a solid polymer electrolyte. The properties of NAFION® films need to be modified.

FIG. 23 shows discharge curves of a prototype battery comprising PAN/TFMSA (PAN 3101) charged using a constant voltage (+1.8V) for various times. The charge capacity increased with an increase of charging time; the battery lasted for 20 minutes when charged for 1 hour. However, the plots discharge voltage as a function of time show no plateau region, which is characteristic of any polymer electrode. The observed discharge curves resemble a typical discharge behavior of a capacitor. Next, a constant current (+10 mA/cm$^2$) was used for charging to estimate the doping rate.

FIG. 24 presents the discharge curves. The doping rate, y, (%) was calculated as:

$$y = 100QM/FW \times 10^{-3} = 96\, Q/W,$$

where W is the weight of the polyaniline electrode in milligrams, Q is the total charge in coulombs, M is the molecular weight of aniline (in grams per mol; in this case, 92 g/mol, and F is Faraday's constant ($9.65 \times 10^4$ C/mol). The performance of the battery improves as doping rate (charging time) is increased. When he battery was charged up to 25% doping level, the battery lasted for about 14 minutes with the light bulb as a load. From the plot of voltage as a function of time, we can estimate charge capacity and energy density as 80 Ah/kg and 80 Wh/kg, respectively, with an average cell voltage of 1 V. These values are significantly high for a practical battery. Moreover, at this doping rate, a semiplateau region is seen in the voltage-time curve. Furthermore, it would be possible to charge the battery up to a higher doping level ($>50\%$) to increase the charge capacity and energy density.

FIG. 25 shows cell voltage as a function of time for accelerated charge-discharge cycles (120 s/cycle) at $\pm 20$ mA/cm$^2$ for a laboratory prototype unit comprising PAN/TFMSA (PAN 3098) and zinc. Note that the polymer battery was tested for the first time using a high current density of $\pm 20$ mA/cm$^2$ (a similar plot presented as FIG. 12 of Progress Report 2 was obtained using $\pm 15$ mA/cm$^2$). The test was continued up to 600 cycles; after a slight, gradual decrease, the cell voltage was stabilized after about $5 \times 10^4$ sec. However, the observed, slight degradation of the cell voltage also in part (or possibly to a large extent) a result of the degradation of the zinc-sheet anode, because zinc is known to form dendrites after a prolonged charge-discharge cycle. It was observed that the zinc-sheet electrode exhibited a roughened surface after the test.

Three Dimensional Platinum Electrodes Fabricated on Thin-Film Substrates as Flexible Battery Electrodes Several electrodes were fabricated on 0.001 and 0.005-inch thick KAPTON ® substrates with a relatively thick layer (about 1 μm) of sputtered platinum. Flexible KAPTON ®. substrates (including those having 0.001, 0.003 and 0.005 inch thickness) (obtained from E.I. du Pont de Nemours & Company, Wilmington, Del. 19898) and exhibited good adhesive properties to a relatively thick layer (about 1 μm) of sputtered platinum. The adhesion of platinum to KAPTON ® appeared to be good, whereas the adhesion between the polyaniline film and the platinum surface was poor. Thus further characterization of the electrodes was not possible. A three-dimensional structured electrode on flexible substrates was fabricated and obtained new modified "fat-post" electrodes and obtained new modified "fat-post" electrodes. FIGS. 1 and 7 respectively show the new three-dimensional micro-structure. A metalized flexible substrate on which the proposed thin-film flexible polymer battery is built. Several flexible insulating substrates were examined and conducted basic electro-chemical screening tests to select the most suitable ones for further polymerization.

The following examples are presented to further explain and describe the present invention. They are not to be construed to be limiting in any way.

EXAMPLE 1

FABRICATION PROCEDURE FOR MAKING 3-D STRUCTURES

A procedure used for the fabrication of a platinum-coated polyimide three-dimensional structure on the thin flexible KAPTON ® substrate is outlined below. Note this fabrication procedure as mentioned earlier is also suitable for fabricating electrodes on solid non-flexible substrates:

Commercially available materials include:
2" squares of KAPTON ® (physically abraded, followed by ultrasonic detergent cleaning).
Ciba Geigy XU408 Probimide Photoimageable Polyimide Resist.
Ciba Geigy Adhesion Promoter System (QZ 3289 & QZ 3290).
Ciba Geigy XU 3301 Developer.
Ciba Geigy XU 3311 Rinse II.
Commercially available equipment includes:
Photoresist Spin Coater (capable 1000 to 4000 rpm).
Hot Plate (prebake)
Masks and fixtures for both photoresist processing and vacuum sputter deposition.
Collimated Light Source.
Vacuum Curing Oven (capable of 350° C.)
MCR Sputter System.

Step 1: The substrate (a 1.5 in square of 0.003" thick KAPTON ® sheet) is physically abraded and cleaned with isopropyl alcohol and Freon ultrasonically. It is then baked at a temperature above 150° C. for at least one hour for dehydration.

Step 2: The adhesion promoter is prepared by applying a layer of adhesion promoter (Ciba Geigy adhesion promoter system) at 4000 rpm for 30 sec and allowed to air dry horizontally for 5 min, thus, allowing the thickness uniformity to be maintained.

Step 3: The polyimide, Ciba Geigy XU 408 Probimide Photo-imageable Polyimide Resist, is applied at 1000 rpm for 30 sec and allowed to air dry horizontally for 1 hr. The substrate is then baked at 90° C. for 30 min and the corners are then carefully removed ensuring that no residual adhesive tape is left.

Step 4: The substrate is placed on a 2-in glass slide with the resist facing upwards. The mask is clamped to the substrate between two glass slides and the substrate is exposed with UV flood exposure system for about 15 sec. This step is followed by immersion developing with agitation for two min and immersion rinsing with agitation for one min to remove unexposed and unreacted polymer, and then blown dry with nitrogen to form the desired three-dimensional microstructure substrate.

Step 5: The postbaking procedure is accomplished by fully curing the polyimide in a vacuum oven by pumping down and increasing the temperature to 350° C. for 45 min and then baking at 350° C. for 30 min. After this step, the substrate is allowed to cool for 15 min at atmospheric pressure.

Step 6: The platinum is deposited using the standard procedure with a 400 Å chromium adhesion layer and an 8000 Å platinum layer.

Polyimide posts which were fabricated with a 100 micron mesh metal shadow mask are shown in FIGS. 26A and 26B. FIGS. 27A and 27B shows polyimide posts made with a 100 micron wire mesh mask with a 30 sec exposure time while FIGS. 28A and 28B and 29A and 29B show posts made at variable exposure periods.

Platinum-coated polyimide posts made with a 20 μm post mask are shown in FIGS. 30A and 30B. Note that the scratches on the surface of the flexible KAPTON ® substrate are caused by physically abrading the surface to achieve better adhesion between the substrate and the polyimide resist layer. In FIG. 30B, the polyimide posts are observed at an angle of 30 degrees. FIG. 31 shows a close-up of the surface profile of the polyimide three-dimensional structure.

EXAMPLE 2

FLEXIBLE KAPTON ® WITH SPUTTERED PLATINUM FILM

Several electrodes were fabricated on KAPTON ® substrates (0.001 and 0.005-in thick purchased from E.I. du Pont de Nemours & Company, Wilmington, Del., 1988) with a relatively thick layer (about 1 μm) of sputtered platinum. Generally, KAPTON ® substrates were found to be compatible with the sputtering Pt deposition process because KAPTON ® is basically made of polyimide. The 0.005-inch-KAPTON ® substrate was, however, found to be too thick to be flexible enough for our application. Moreover, it became curled after the platinum electrode was deposited, due to the heat build-up during the sputtering process, the stress from the thin metal film, and was, thus, not suitable for subsequent electrochemical studies. On the other hand, the 0.001-inch KAPTON ® remained mechanically intact after the metal deposition and was flexible enough for our application. The platinum-sputtered KAPTON ® substrates were characterized electrochemically in 20% $H_2SO_4$, and exhibited cyclic voltammograms similar to a Pt wire.

The platinized 0.001-inch-KAPTON ® substrate was the most desirable flexible substrate among the three substrates studied and used in subsequent experiments.

EXAMPLE 3

ELECTROCHEMICAL POLYMERIZATION OF POLYANILINE ON A FLEXIBLE ELECTRODE

Trifluoromethanesulfonate-doped polyaniline (PAN/TFMSA) was electrochemically synthesized on a Pt-sputtered 0.001-inch KAPTON ® in a solution containing 0.1M aniline and 1M TFMSA using a potential cycling method with an electrochemical window between −0.2 V to +0.8 vs. SCE. FIG. 32 shows the cyclic voltammogram during polymerization. FIGS. 33A and 33B show the surface morphology of such polymer. The surface exhibits a fine microstructure that is similar to the morphology of PAN/Ts with some clusters of the polymer dispersed. It is important to note that the surface of the PAN/TFMSA prepared on KAPTON ® does not contain cracks, which were always observed when the polymer was made on a conventional flat ceramic substrate.

As observed with the PAN/Ts, the adhesion of the polymer to the flat surface of sputtered platinum on KAPTON ® was poor. More experimental conditions characterize the battery performance of the thin-film PAN/TFMSA using three-dimensionally modified KAPTON ® substrate.

EXAMPLE 4

TRIFLUOROMETHANESULFONIC-ACID-BASED SELF-DOPED POLYANILINE

The polyaniline polymer was synthesized on a flexible KAPTON ® substrate in an aqueous solution of 0.1M aniline monomer and 1M tosylate as the external dopant as described in Example 1. As usual, the potential was cycled between about 0.2 V to +0.8 V against a SCE at a scan rate of 0.1 V/sec. FIG. 34 shows a typical cyclic voltammogram during the polymerization, and the surface morphology is shown in FIGS. 35A and 35B. The surface exhibits an ultrafine microstructure with a high surface area, which is very similar to the polyaniline/tosylate (PAN/Ts) obtained on a conventional flat ceramic substrate. FIG. 36 is a scanning electron micrograph of the top view of polyaniline polymer grown on a 100 micron platinum coated 3-D structure. For comparison, polyimide posts were also made using a 20 micron mesh. A 20 micron three-dimensional array results in an increase in the surface area and, therefore, produce a more efficient electrode capable of carrying an increased charge. FIGS. 19A and 19B show a scanning electron micrograph of a polyimide posts made with a 20 micron mask while the lower photograph is a close-up view of the same 20 micron 3D polyimide array.

ELECTROPOLYMERIZATION

Electrochemical polymerization was performed on a three-dimensional structured platinum sputtered 0.001 inch-KAPTON ® sheet, using a potential cycling method in an aqueous solution of 0.1M aniline monomer and 1M Tosylate as the dopant. FIG. 38 shows scanning electron micrograph of the polyimide three-dimensional structure on the KAPTON ® sheet. The thickness of the "fat posts" is approximately 4.4 μm. The potential was cycled between −0.2 V to +0.8 V against a SCE at a scan rate of 0.1 V sec. FIGS. 21A and 21B shows the surface morphology of polyaniline grown on such an electrode. The surface exhibits an ultrafine microstructure with a high surface area which is very similar to the polyaniline/tosylate (PAN/Ts) obtained on a conventional flat ceramic substrate. FIGS. 40A and 40B show respectively PAN/Ts polymerized on 100 μm diameter posts.

While only a few embodiments of the invention have been shown and described herein, it will become apparent to those skilled in the art that various modifications and changes can be made in the method to prepare a polymeric three dimensional electrode surface for use as a battery electrode or the electrode itself without departing from the spirit and scope of the present invention. All such modifications and changes coming within the scope of the appended claims are intended to be carried out thereby.

We claim:

1. A three dimensional electrically conductive organic polymer covered structure having multiple surface microprotrusions and improved current carrying capacity as compared to a substantially smooth surface;
   wherein the organic polymer is selected from polyaniline or polypyrrole;
   wherein the microprotrusions of polymer protrude between about 10 and 100 micrometers from the general polymer surface;
   the three dimensional micro structure carries between about 40 to 100 times the current as compared to a substantially smooth surface in terms of current per square unit of area; and
   the entire three dimensional structure is subject to reversible charging.

2. The structure of claim 2 which reversibly charged at between about 5 and 15 milliampere per square centimeter.

3. A three-dimensional polymer structure for use as a battery electrode, having improved current carrying capacity and reversible charging properties as compared to a substantially smooth polymer surface, which structure comprises:
- a thin surface layer of polyaniline or polypyrrole film on a substrate surface,
- wherein the polyaniline or polypyrrole film has a thickness of between about 0.1 and 0.5 microns and the substrate surface is irregular or patterned having a protruding away surface, wherein a representative protrusion has a top surface area of between about 5 and 400 square micrometers, a relative height of between about 10 and 100 micrometers from the surface and the surface area of protrusions total between about 40 to 90 percent of the entire surface area of the battery electrode.

4. The three-dimensional polymer substrate of claim 3 wherein the height of the protrusion is between about 10 and 50 micrometers from the surface.

5. The three-dimensional polymer substrate of claim 3 wherein the polymer is polyaniline.

6. The three-dimensional polymer of claim 5 which further includes p-toluenesulfonic acid.

7. The three-dimensional polymer of claim 5 which further includes trifluoromethanesulfonic acid.

8. The three-dimensional polymer of claim 3 wherein the polymer is polypyrrole.

9. The polymer-substrate structure of claim 3 is capable of reversible charging at between about $\pm 5$ to 15 milliA/cm$^2$.

10. A three-dimensional organic electrically conducting polymeric battery electrode having multiple microprotrusions obtained by a process to produce the three-dimensional microstructure surface device, which is useful as a battery electrode, which process comprises:
- (a) fabricating on a suitable smooth substrate a regular or irregular array of surface microprotrusions having a relative height of between about 5 and 200 microns,
- (b) contacting the surface of the protrusions with a solution containing an electropolymerizable organic monomer which is capable of being electropolymerized and polymerizes to fabricate a thin layer of an electrically conductive polymer on the surface of the micro protrusions,
- wherein the three-dimensional electropolymer has a thickness of between about 0.001 and 1 micron, and
- (c) obtaining the composite device which is useful as a battery electrode.

11. The battery electrode obtained by the process of claim 10 wherein the monomer is selected from aniline, pyrrole or thiophene.

12. The battery electrode obtained by the process of claim 11 wherein the substrate is a non electrically conducting ceramic.

* * * * *